(12) United States Patent
Rodney

(10) Patent No.: US 10,294,401 B2
(45) Date of Patent: May 21, 2019

(54) DOWNHOLE FLUIDS WITH HIGH DIELECTRIC CONSTANT AND HIGH DIELECTRIC STRENGTH

(71) Applicant: Halliburton Energy Services, Inc., Houston, TX (US)

(72) Inventor: Paul F. Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 207 days.

(21) Appl. No.: 15/305,925

(22) PCT Filed: May 14, 2015

(86) PCT No.: PCT/US2015/030825
§ 371 (c)(1),
(2) Date: Oct. 21, 2016

(87) PCT Pub. No.: WO2016/182577
PCT Pub. Date: Nov. 17, 2016

(65) Prior Publication Data
US 2017/0158938 A1   Jun. 8, 2017

(51) Int. Cl.
| | |
|---|---|
| *C09K 8/32* | (2006.01) |
| *E21B 21/06* | (2006.01) |
| *C09K 8/03* | (2006.01) |
| *E21B 33/13* | (2006.01) |

(Continued)

(52) U.S. Cl.
CPC ............. *C09K 8/03* (2013.01); *C09K 8/032* (2013.01); *C09K 8/32* (2013.01); *E21B 21/00* (2013.01); *E21B 21/06* (2013.01); *E21B 33/13* (2013.01); *E21B 43/26* (2013.01)

(58) Field of Classification Search
CPC .. C09K 8/03; C09K 8/032; C09K 8/32; E21B 21/00; E21B 21/06; E21B 33/13; E21B 43/26
See application file for complete search history.

(56) References Cited

U.S. PATENT DOCUMENTS

| | | |
|---|---|---|
| 2,953,524 A | 9/1960 | Rich |
| 4,215,682 A | 8/1980 | Davis et al. |
| 4,375,718 A | 3/1983 | Wadsworth et al. |

(Continued)

FOREIGN PATENT DOCUMENTS

| | | |
|---|---|---|
| AU | 621744 | 3/1992 |
| AU | 624926 | 6/1992 |

(Continued)

OTHER PUBLICATIONS

International Search Report and Written Opinion, Application No. PCT/US2015/030825; 10 pgs, dated Apr. 28, 2016.

(Continued)

*Primary Examiner* — Zakiya W Bates
*Assistant Examiner* — Crystal J Miller
(74) *Attorney, Agent, or Firm* — Baker Botts L.L.P.

(57) ABSTRACT

The present disclosure relates to a composite fluid including an electrically insulating foundation fluid having a dielectric constant and a dielectric strength, and an additive combined with the foundation fluid that results in a composite fluid having a dielectric constant and a dielectric strength greater than the dielectric constant and the dielectric strength of the foundation fluid.

24 Claims, 13 Drawing Sheets

(51) Int. Cl.
*E21B 43/26* (2006.01)
*E21B 21/00* (2006.01)

(56) References Cited

U.S. PATENT DOCUMENTS

| | | | |
|---|---|---|---|
| 4,412,029 A | 10/1983 | Kehr et al. | |
| 4,588,537 A | 5/1986 | Klaase et al. | |
| RE32,171 E | 6/1986 | van Turnhout | |
| 4,592,815 A | 6/1986 | Nakao | |
| 5,096,883 A | 3/1992 | Mercer et al. | |
| 5,401,446 A | 3/1995 | Tsai et al. | |
| 5,858,928 A | 1/1999 | Aubert et al. | |
| 6,006,831 A | 12/1999 | Schlemmer et al. | |
| 6,029,755 A | 2/2000 | Patel | |
| 6,365,088 B1 | 4/2002 | Knight et al. | |
| 6,605,570 B2 | 8/2003 | Miller et al. | |
| 6,645,403 B1 | 11/2003 | Park et al. | |
| 6,691,805 B2 | 2/2004 | Thaemlitz et al. | |
| 6,825,152 B2 | 11/2004 | Green | |
| 6,910,537 B2 | 6/2005 | Brown et al. | |
| 7,112,557 B2 | 9/2006 | Thaemlitz et al. | |
| 7,293,609 B2 | 11/2007 | Dealy et al. | |
| 7,560,419 B2 | 7/2009 | Fang et al. | |
| 8,153,702 B2 | 4/2012 | Knorr et al. | |
| 8,288,917 B2 | 10/2012 | Nakatsuka et al. | |
| 8,288,918 B2 | 10/2012 | Suzuki et al. | |
| 8,415,416 B2 | 4/2013 | Chin et al. | |
| 8,607,895 B2 | 12/2013 | Hoskins | |
| 8,747,961 B2 | 6/2014 | Takaoka et al. | |
| 8,785,555 B2 | 7/2014 | Kashiwagi | |
| 8,790,449 B2 | 7/2014 | Li et al. | |
| 2002/0128158 A1 | 9/2002 | Green | |
| 2002/0147113 A1 | 10/2002 | Green | |
| 2002/0169085 A1 | 11/2002 | Miller et al. | |
| 2003/0150614 A1 | 8/2003 | Brown et al. | |
| 2006/0037516 A1* | 2/2006 | Moeny | B23H 1/08 106/486 |
| 2006/0096759 A1 | 5/2006 | Reddy et al. | |
| 2006/0185889 A1 | 8/2006 | Negle | |
| 2009/0242276 A1 | 10/2009 | Hummes et al. | |
| 2010/0152070 A1 | 6/2010 | Ghassemzadeh | |
| 2010/0193244 A1 | 8/2010 | Hoskins | |
| 2011/0111988 A1 | 5/2011 | Ionescu et al. | |
| 2012/0245016 A1* | 9/2012 | Curry | C04B 35/4682 501/137 |
| 2013/0112414 A1* | 5/2013 | Kumar | C09K 8/03 166/300 |
| 2013/0143777 A1 | 6/2013 | Wang | |
| 2013/0261032 A1 | 10/2013 | Ladva et al. | |
| 2013/0285781 A1 | 10/2013 | Yin | |
| 2013/0296199 A1 | 11/2013 | Ghassemzadeh | |
| 2014/0014332 A1* | 1/2014 | Savari | C09K 8/03 166/250.04 |
| 2015/0322326 A1* | 11/2015 | Van Slyke | C09K 8/34 175/16 |

FOREIGN PATENT DOCUMENTS

| | | |
|---|---|---|
| CA | 242656 | 9/1924 |
| CA | 1218519 | 3/1987 |
| CA | 2006009 | 6/1990 |
| CA | 2584272 | 4/2006 |
| CA | 2693431 | 1/2009 |
| CA | 2790724 | 9/2011 |
| EP | 259111 | 3/1988 |
| EP | 448646 | 10/1991 |
| EP | 714978 | 6/1996 |
| EP | 2179000 | 4/2010 |
| EP | 2196516 | 6/2010 |
| EP | 2584272 | 4/2013 |
| GB | 58045 | 9/1946 |
| WO | 2000/041480 | 7/2000 |
| WO | 2003/018709 | 3/2003 |
| WO | 2009/006731 | 1/2009 |
| WO | 2012/170382 | 12/2012 |
| WO | 2013/116072 | 8/2013 |
| WO | 2014/074473 | 5/2014 |

OTHER PUBLICATIONS

Cogetherm, Cogebi, "Mica plates for high-performance thermal and electrical insulation." www.redseal.com/download.cogebil.pdf; 4 pages.

Bergman, David J. "Exactly solvable microscopic geometries and rigorous bounds for the complex dielectric constant of a two-component composite material." Physical Review Letters 44.19 (May 12, 1980): 1285; 3 pages.

Pearce, C. A. R. "The electrical conductivity and permittivity of mixtures." British Journal of Applied Physics 8.7 (1957): 301; 8 pages, Dec. 2, 1954.

Chung, K. T., A. Sabo, and A. P. Pica. "Electrical permittivity and conductivity of carbon black-polyvinyl chloride composites." Journal of Applied Physics 53.10 (1982): 6867-6879.

Schneider Electric, "Magnetic Flowmeters Electrical Conductivity of Process Liquids." Foxboro, Technical Information, TI 027-072 (1996); 16 pages.

Bergman, David J. "The dielectric constant of a simple cubic array of identical spheres." Journal of physics C: Solid state physics 12.22 (Mar. 22, 1979): 4947; 14 pages.

Rodriguez, Adolfo, and Raul Abreu. "A mixing law to model the dielectric properties of porous media." SPE Latin America Petroleum Engineering Conference. Society of Petroleum Engineers, Oct. 14, 1990; 11 pages.

Du Frane, Wyatt L., et al. "Electrical properties of polycrystalline methane hydrate." Geophysical Research Letters 38.9 (May 11, 2011); 5 pages.

Kendall, E. J. M. "The Electrical Conductivity of Medium Heavy Crude Oil." Journal of Canadian Petroleum Technology 17.03 (1978); 3 pages.

Sawa, G. "Dielectric breakdown in solid dielectrics." IEEE transactions on electrical insulation 6 (1986): 841-846.

Peruani, F., et al. "Dielectric breakdown model for composite materials." Physical Review E 67.6 (Jun. 30, 2003): 066121; 6 pages.

Shukla, D. K., and S. Mollah. "dc conductivity and dielectric properties of $V_2O_5$—$Bi_2O_3$—ZnO glass." Indian journal of pure and applied physics 45.1 (Jan. 2007): 52; 5 pages.

Song, C. H., et al. "Impedance Analysis and Low-Frequency Dispersion Behavior of $Bi_4Ti_3O_{12}$ Glass." Journal of the Korean Physical Society 56.1 (Jan. 2010): 462-466; 5 pages.

Berger, L. I. "Dielectric strength of insulating materials." Carbon 1 (2000): 2; 6 pages.

Nunes, Janine. Controlled manipulation of engineered colloidal particles. 2010; 178 pages.

Inculet, I. I., R. M. Quigley, and A. Garg. "Mica electrets." Electrets, 1988.(ISE 6) Proceedings., 6th International Symposium on (IEEE Cat. No. 88CH2593-2). IEEE, 1988.

Jian-quan, Zhou, et al. "AC and lightning breakdown strength of transformer oil modified by semiconducting nanoparticles." Electrical Insulation and Dielectric Phenomena (CEIDP), 2011 Annual Report Conference on. IEEE, 2011.

Office Action for Canadian Patent Application No. 2982556, dated Aug. 17, 2018; 4 pages.

* cited by examiner

DOWNHOLE FLUIDS WITH HIGH DIELECTRIC CONSTANT AND HIGH DIELECTRIC STRENGTH

RELATED APPLICATIONS

This application is a U.S. National Stage Application of International Application No. PCT/US2015/030825 filed May 14, 2015, which designates the United States, and which is incorporated herein by reference in its entirety.

TECHNICAL FIELD

The present disclosure relates to downhole fluids and, more particularly, downhole fluids with a high dielectric constant and a high dielectric strength.

BACKGROUND

Natural resources, such as oil or gas, residing in a subterranean formation can be recovered by drilling a wellbore that penetrates the formation. A variety of fluids are used in both drilling and completing the wellbore and in resource recovery. Each of these fluids may serve different purposes within a wellbore. During the drilling of the wellbore, for example, a drilling fluid may be used to, among other things, cool the drill bit, lubricate the rotating drill string to prevent it from sticking to the walls of the wellbore, prevent blowouts by serving as a hydrostatic head to the entrance into the wellbore of formation fluids, and remove drill cuttings from the wellbore.

BRIEF DESCRIPTION OF THE DRAWINGS

A more complete and thorough understanding of the various embodiments and advantages thereof may be acquired by referring to the following description taken in conjunction with the accompanying drawings, in which like reference numbers indicate like features, and wherein.

DETAILED DESCRIPTION

A downhole fluid with particular electrical and/or magnetic properties may be formulated by combining a foundation fluid with particles and/or other fluids, which may be collectively referred to as "additives," to form a composite fluid with electrical and/or magnetic properties different from those of the foundation fluid. The particular electrical and/or magnetic properties of the downhole fluid may be formulated to achieve or maintain a particular environment within the wellbore during drilling, completion, maintenance, or operation of a well. The electrical and/or magnetic properties of the downhole fluids may affect how system components within the wellbore interact with one another, the wellbore, and the surrounding formation. As an example, the electrical properties of the downhole fluid may, among other things, affect the flow of electrical current through the downhole fluid. As another example, the magnetic properties of a downhole fluid may, among other things, affect how system components magnetically attract, repulse, or otherwise influence one another. Thus, additives may be used to formulate a downhole fluid with particular electrical and/or magnetic properties in order to achieve or maintain a particular environment within the wellbore. Embodiments of the present disclosure and its advantages may be understood by referring to FIGS. 1 through 4, where like numbers are used to indicate like and corresponding parts.

Figure 1:
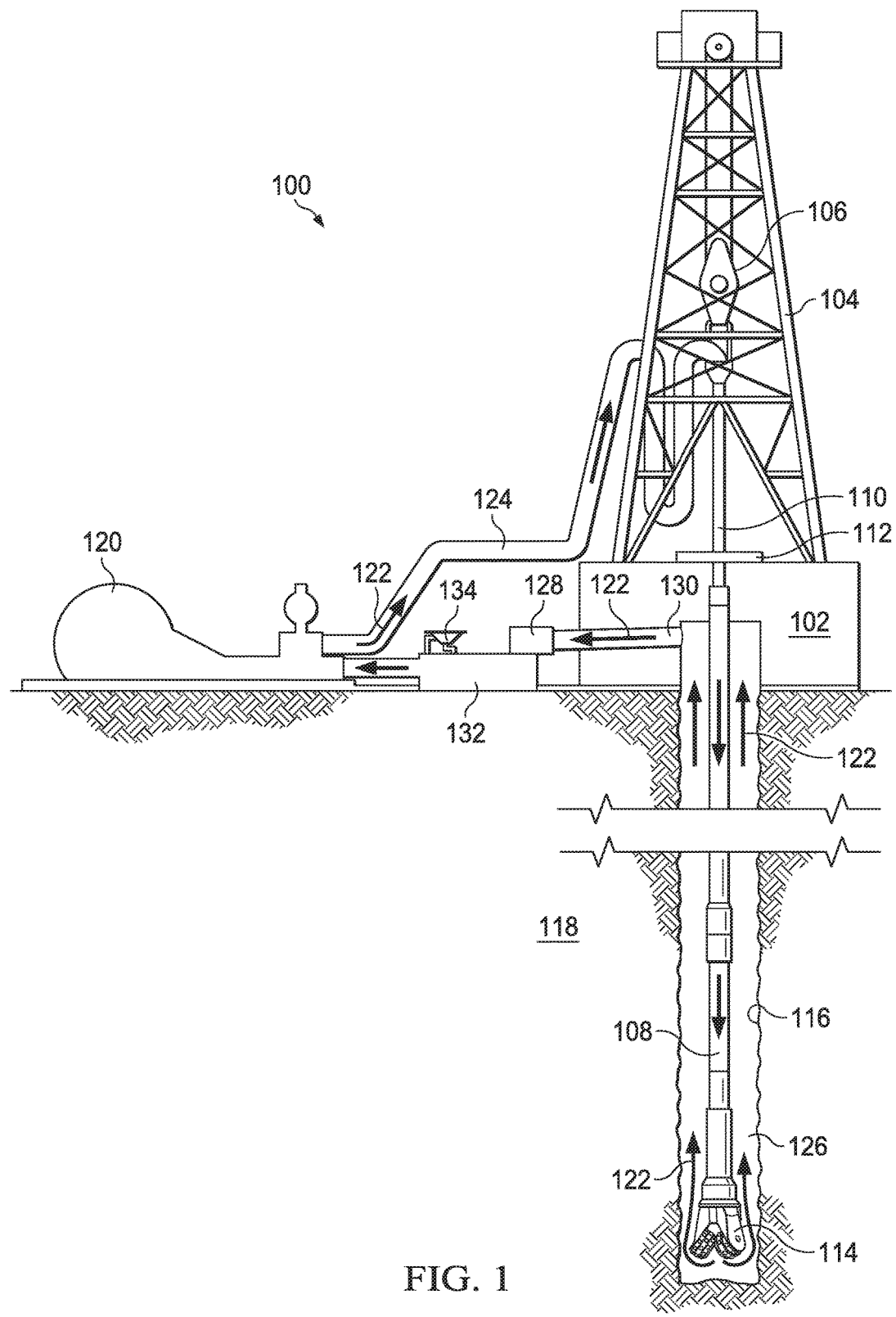
FIG. 1 is an elevation view of an exemplary drilling system in which a drilling fluid may be used.

FIG. 1 is an elevation view of an exemplary drilling system in which a drilling fluid may be used. Drilling system 100 may include drilling platform 102 that supports derrick 104 having traveling block 106 for raising and lowering drill string 108. Kelly 110 may support drill string 108 as it is lowered through rotary table 112. Drill bit 114 may be attached to the distal end of drill string 108 and may be driven either by a downhole motor and/or via rotation of drill string 108 from the well surface. As drill bit 114 rotates, it may create wellbore 116, which penetrates various subterranean formations 118. Wellbore 116 may be any hole drilled into a formation for the purpose of exploration or extraction of natural resources such as, for example, hydrocarbons, or for the purpose of injection of fluids such as, for example, water, wastewater, brine, or water mixed with other fluids. Additionally, wellbore 116 may be any hole drilled into a formation for the purpose of geothermal power generation.

Drilling system 100 may also include pump 120, which circulates drilling fluid 122 through feed pipe 124 to kelly 110, which in turn conveys drilling fluid 122 downhole through the interior of drill string 108 and through one or more orifices in drill bit 114. Drilling fluid 122 may then circulate back to the surface via annulus 126 formed between drill string 108 and the sidewalls of wellbore 116. At the surface, recirculated or spent drilling fluid 122 may exit annulus 126 and may be conveyed to one or more fluid processing units 128 via an interconnecting flow line 130. After passing through fluid processing units 128, a cleaned drilling fluid 122 may be deposited into retention pit 132. Although fluid processing unit 128 is illustrated in FIG. 1 near the outlet of the wellbore 116, fluid processing unit 128 may be located at a distance from the outlet of wellbore 116.

Drilling system 100 may further include mixing hopper 134 communicably coupled to or otherwise in fluidic communication with retention pit 132. Mixing hopper 134 may include, but is not limited to, mixers and related mixing equipment. Mixing hopper 134 may be used to add additives to drilling fluid 122 to create a composite fluid.

Additives may be used to create drilling fluid 122 with specific electrical and/or magnetic properties. Drilling fluid 122 may be a composite fluid including a foundation fluid to which particles and/or other fluids, which may collectively be referred to as additives, are added to create a new composite fluid with magnetic and/or electrical properties different than those of the foundation fluid. The electrical and/or magnetic properties of drilling fluid 122 may be selected or adjusted with additives based on the intended use of drilling fluid 122 within the wellbore and/or the actual or anticipated conditions within the wellbore during drilling, completion, maintenance, or operation of the well.

A downhole fluid may be any fluid used in the drilling, completion, maintenance, or operation of a well. For example, in addition to drilling fluid 122 described in FIG. 1, other downhole fluids, such as spacer fluids and fracturing fluids, may be similarly composed of a foundation fluid to which additives including particles and/or other fluids are added. Spacer fluids and fracturing fluids may be used in place of drilling fluid 122 in drilling system 100 or another drilling system or well system as appropriate. As another example, the downhole fluid may be concrete to which additives including particles and/or other fluids are added prior to the concrete completely curing.

This disclosure describes techniques for modifying the electrical and magnetic properties of a downhole fluid (e.g., drilling fluid 122, spacer fluids, fracturing fluids, concrete, or other fluids used downhole), as well as techniques for using the resulting fluid for impedance matching. As an example, additives may be selected and added to change the electrical properties of the downhole fluid. As another example, additives may be selected and added to change the magnetic properties of the fluid. As yet another example, additives may be selected and added to change the electrical and magnetic properties of the fluid. The additives may be selected and added to change the electrical and/or magnetic properties of the fluid for the purpose of impedance matching.

Electrical Properties

A downhole fluid may be formulated or modified to have particular electrical properties in order to limit electrical discharge through the downhole fluid. In electric discharge drilling, for example, a low frequency, high electric field may be applied to a targeted region of formation 118, which may cause formation 118 to physically break down around the targeted region. To limit discharge of the electric field through the downhole fluid and allow more electrical current to flow into the targeted region of formation 118, an electrically insulating downhole fluid with a high dielectric constant and a high dielectric strength at a particular operating frequency may be used. An electrically insulating downhole fluid may restrict the movement of electrical charges, and therefore, the flow of electrical current through the downhole fluid. A high dielectric constant and high dielectric strength may also decrease electrical discharge through the downhole fluid. The dielectric constant of the downhole fluid may indicate the ability of the downhole fluid to store electrical energy when exposed to an electric field, such as a voltage potential created by an electric discharge drilling system, while the dielectric strength of the downhole fluid may indicate a voltage level to which the downhole fluid may be exposed before experiencing electrical breakdown, or a loss of its electrically insulating properties.

The foundation fluid may be an electrically insulating fluid. The foundation fluid may include a single fluid or a combination of more than one fluid. The components of the foundation fluid may be synthetically produced or refined from naturally occurring materials with electrically insulating properties. Further, the components of the foundation fluid may be selected to withstand a range of temperatures and pressures typical within a wellbore. For example, non-aqueous, oil-based fluids may withstand higher temperatures and higher pressures before breaking down as compared to other aqueous fluids. As an example, the foundation fluid may be formed of compounds including branched-chain paraffins having between approximately 18 and 40 carbon atoms per molecule, diester oils, hydrocarbon liquids substantially immiscible with water, oleaginous fluids (e.g., esters, olefins, diesel oils, and mineral oils including n-paraffins, iso-paraffins, cyclic alkanes, and/or branched alkanes), low polynuclear aromatic oils with a mixture of branched and cyclic paraffins, asphaltic mineral oils, and/or asphaltic residual fuel oils, and combinations thereof.

One or more additives may be selected to add to the foundation fluid to form a composite fluid with different electrical properties than those of the foundation fluid. Additives may be selected such that, when combined with the foundation fluid, the addition of additives results in the formation of a composite fluid with a dielectric constant and/or dielectric strength approximately equal to a target value or within a target range. The target value or range may be different from the value or range of the dielectric constant and/or dielectric strength of the foundation fluid. For example, one or more additives may be selected such that, when added to the foundation fluid, the addition of the additives results in the formation of a composite fluid with a dielectric constant and/or dielectric strength greater than the dielectric constant and/or dielectric strength of the foundation fluid. Additionally, one or more additives may be selected such that, when added to the foundation fluid or composite fluid, the addition of the additives results in the formation of a composite fluid with a dielectric constant and/or dielectric strength less than the dielectric constant and/or dielectric strength of the foundation fluid.

Additives may include particles, fluids, and combinations thereof. For example, an additive may include particles formed of a composition having a dielectric constant and/or a dielectric strength greater than that of the foundation fluid. As another example, additives may be formed of a mixture of different particles where each type of particle is formed of a composition having a dielectric constant and/or a dielectric strength greater than that of the foundation fluid. Additives may also include one or more fluids. For example, the additive may include a fluid having a conductivity greater than that of the foundation fluid. As another example, the additive may include additional foundation fluid.

Adding additives to the foundation fluid may form a composite fluid with different electrical properties than those of the foundation fluid. As an example, the addition to the foundation fluid of particles with a dielectric constant greater than that of the foundation fluid may result in the formation of a composite fluid with a dielectric constant greater than that of the foundation fluid. As another example, the addition to the foundation fluid of particles with a dielectric strength greater than that of the foundation fluid may result in the formation of a composite fluid with a dielectric strength greater than that of the foundation fluid. Further, the addition to the foundation fluid of particles with both a dielectric constant and a dielectric strength greater than those of the foundation fluid may result in the formation of a composite fluid with a dielectric constant and a dielectric strength greater than those of the foundation fluid. In order to maximize the dielectric constant of the composite fluid, the particles may be treated to have electric dipole moments, the particles may be created with electric dipole moments, and/or the conductivity of the foundation fluid may be increased according to the methods described in more detail below.

The electrical conductivity of the particles may also affect the dielectric constant and dielectric strength of the composite fluid formed through the addition of the particles to the foundation fluid. For example, as the electrical conductivity of the particles increases, the enhancement to the dielectric constant and/or the dielectric strength of the composite fluid may diminish. Thus, the particles may be formed of a composition with an electrical conductivity less than that of the foundation fluid to provide a greater enhancement to the dielectric constant and/or dielectric strength of the composite fluid. As an example, the particles may be formed of a composition having an electrical conductivity of approximately one half the electrical conductivity of the foundation fluid.

Exemplary compositions from which the particles may be formed include mica in any of its various forms (e.g., muscovite, phlogopite, leidolite, fluorophlogopite, glass-bonded mica, and biotite), polytetrafluoroethylene (Teflon® by DuPont Co.) and/or chemical variants of tetrafluoroethylene, glass or a composition of glass including fused silica and alkali-silicate, polystyrene, polyethylene, diamond, lead zirconate titanate (PZT), sodium chloride crystalline, potassium bromide crystalline, silicone oil, benzene, and combinations thereof. Additionally, the particles may be formed of other compositions having a dielectric constant between approximately 2 and 100, and a dielectric strength of between approximately 10 and 200 kilovolts per mm (kV/mm).

The shape of the particles may be selected based on the target value or range of the dielectric constant and/or dielectric strength of the composite fluid as compared to the foundation fluid. For example, the addition of particles in the shape of disks or flakes may result in a greater increase in the dielectric constant and/or dielectric strength of the composite fluid than the addition of particles in the shape of needles, ellipsoids, and spheres. The size of the particles may be selected to be larger than the chemical compounds of the material(s) from which the particles are formed, yet small enough to ensure uniform distribution within the composite fluid. For example, particles in the shape of flakes with a diameter between approximately 10 nm and 100,000 nm may uniformly distribute into the composite fluid such that all portions of composite fluid maintain a relatively uniform dielectric constant and dielectric strength. As an example, the particles may be disks with a diameter of approximately 50 nanometers (nm) and a thickness of approximately 2 nm.

An additive may also include particles that, when added to the foundation fluid result in the formation of a composite fluid with an increased electric dipole moment per unit volume, and thus a dielectric constant greater than the foundation fluid. The average electric dipole moment per unit volume, which may also be referred to as the polarization density of a composition, may represent the number and strength of electric dipoles in the composition. The electric dipoles in the particles may increase the available electrical polarization mechanisms in the composite fluid to which the particles are added. Thus, when an external electric field is applied to the composite fluid, the electric dipoles in the particles, and thus in the composite fluid, may align to oppose the external electric field. The alignment of the electric dipoles in opposition of the external electric field may result in a higher net electrical polarization in the composite fluid as compared to the foundation fluid. As discussed in more detail with respect to FIG. 3, increases in the polarization density of the composite fluid may cause increases in the dielectric constant of the composite fluid. Particles may be treated to have electric dipoles and/or created to have a net electric dipole moment.

Particles may be treated to impart electric dipoles within the composition from which the particles are formed. For example, the particles may be placed in the presence of an electric field that causes the formation of electric dipoles within the composition from which the particles are formed and, while in the presence of the electric field, heated to a temperature beyond the melting point of the composition from which the particles are formed and subsequently cooled. Heating and cooling the particles while in the presence of the electric field may result in the creation of electric dipoles that continue after the particles are removed from the electric field. The electric dipoles may be quasi-permanent, which may be referred to as electrets, or permanent, which may be referred to as permanent electric dipoles. The formation of quasi-permanent and permanent electric dipoles in a particle may increase the electric dipole moment per unit volume in the particle. The resulting electric dipole moment per unit volume for a particular particle may depend on the magnitude and number of electric dipoles created by the treatment of the particle. The magnitude and number of electric dipoles created by the treatment of a particle may depend on, among other things, the magnitude of the electric field to which the particle is exposed, the duration of exposure, the temperature to which the particle is heated, and the molecular structure of the composition from which the particle is formed.

In addition to treating particles to impart electric dipoles, particles may be created to have a net electric dipole moment. Such particles may, for example, include Janus particles created with a net electric dipole moment. A Janus particle may include a spherical or ellipsoidal particle including two distinct regions. The two regions may have different electrical polarities, creating net electric dipole moment for the particle. Particles having a net electric dipole moment may be created by thermal evaporation, masking, emulsions, site-specific growth, or any other method that allows for the creation of a two-sided particle with different electrical polarities. The dipole moment of Janus particles may be further enhanced by placing the particles in the presence of an electric field and, while in the presence of the electric field, heating the particles to a temperature beyond the melting point of the composition from which the particles are formed. The particles created to have net electric dipole moments may be combined with the foundation fluid to form a composite fluid with a dielectric constant greater than that of the foundation fluid.

Particles treated to have electric dipoles and/or particles created to have a net electric dipole moment may be formed of any composition capable of electrical polarization. Exemplary compositions of particles that may be treated to impart an electric dipole include mica in any of its various forms, polytetrafluoroethylene, chemical variants of tetrafluoroethylene, glass, polystyrene, polyethylene, diamond, lead zirconate titanate (PZT), sodium chloride crystalline, potassium bromide crystalline, silicone oil, benzene, and combinations thereof.

The size and shape of particles treated to impart or created with electric dipoles may be selected to ensure uniform distribution within the composite fluid. For example, particles in the shape of flakes with a diameter between approximately 10 nm and 100,000 nm may uniformly distribute into the composite fluid such that the composite fluid has a relatively uniform dielectric constant. As the size of the particles increases, the distribution of the particles within the composite fluid may vary, which may cause variation in the dielectric constant throughout the composite fluid.

As another example, an additive may include a conductive fluid that is soluble in the foundation fluid. The addition to the foundation fluid of a conductive fluid that is soluble in the foundation fluid may result in the formation of a composite fluid with an electrical conductivity greater than that of the foundation fluid. A composite fluid with a greater conductivity than that of the foundation fluid, when combined with particles having a dielectric constant greater than that of the foundation fluid combined with the conductive fluid, may result in a dielectric constant much greater than would occur from adding the particles alone. As discussed in more detail with respect to FIG. 2, increasing the conductivity of the composite fluid may result in greater enhancement of the dielectric constant of the resulting composite fluid than would be achieved through the addition of particles alone.

The conductive fluid may be formed of a composition having an electrical conductivity greater than that of the foundation fluid. Exemplary compositions from which the conductive fluid may be formed include an alcohol or a derivative thereof (such as glycol, ethylene glycol, butylene glycol, propylene glycol, pentylene glycol, hexamethylene glycol, heptamethylene glycol, octamethylene glycol, monoethylene glycol, diethylene glycol, triethylene glycol, tetraethylene glycol, methyl alcohol, benzyl alcohol, diethyl oxylate, and/or ethyle amine), guaiacol, methyl acetate, ethyl acetate, butyl acetate, and combinations thereof.

As yet another example, an additive may include foundation fluid. For example, if the dielectric constant and/or dielectric strength of the resulting composite fluid exceeds the target value or range following the addition of one or more additives, additional foundation fluid may be added to dilute the composite fluid and thus reduce the dielectric constant and/or dielectric strength of the composite fluid.

Analytical estimates may be used to select the additive(s) added to the foundation fluid in order to form a composite fluid with a dielectric constant and/or dielectric strength approximately equal to a target value or within a target range. These methods may take into account the properties of the additive(s) (e.g., dielectric constant, dielectric strength, and/or conductivity), the properties of the foundation fluid (e.g., dielectric constant, dielectric strength, and/or conductivity), and the properties of any other components in the composite fluid. Analytical estimates may also take into account conditions in which the composite fluid will be used and what effect those conditions will have on the composite fluid. For example, the dielectric constant and/or dielectric strength of the composite fluid may change based on the frequency of the electric fields exerted on the fluid and/or the temperature of the fluid. If the dielectric constant and/or the dielectric strength of the resulting composite fluid are not approximately equal to the target value or within the target range, then additional additives may be selected and added to the fluid.

The additives may be added to the foundation fluid to form a composite fluid with electrical properties different than those of the foundation fluid. The amount of an additive to be added to the foundation fluid may be selected such that the combination of the additive and the foundation fluid results in the formation of a composite fluid with a dielectric constant and/or dielectric strength approximately equal to a target value or within a target range. The amount of an additive added to the foundation fluid may affect the dielectric constant and/or dielectric strength of the resulting composite fluid. For example, increasing the amount of additive added to the foundation fluid may result in an increase in the dielectric constant and/or dielectric strength of the resulting composite fluid. The amount of an additive necessary to form a composite fluid with a dielectric constant and/or dielectric strength approximately equal to the target value or within the target range may vary depending on, for example, the volume fraction of the additive, the dielectric constant and/or dielectric strength of the additive and foundation fluid, the electrical conductivity of the additive and foundation fluid, and/or the conditions within the wellbore. Exemplary effects of additives on the electrical properties of a downhole fluid are discussed in further detail with respect to FIGS. 2 and 3.

Additives may be added to the foundation fluid at the well site or may be added to the foundation fluid before the foundation fluid is brought to the well site. For example, additives may be added to the foundation fluid via mixing hopper 134 (shown in FIG. 1) before the fluid is pumped into the wellbore. As another example, additives may added to a container in which the foundation fluid is stored (e.g., retention pit 132 shown in FIG. 1) such that the additives are mixed into the foundation fluid as the fluid is pumped into the wellbore. As yet another example, the additives may be placed into the wellbore and mixed with the foundation fluid as the fluid circulates within the wellbore. As still another example, additives may be added to the foundation fluid during the manufacture and/or preparation of the composite fluid.

Figure 2:
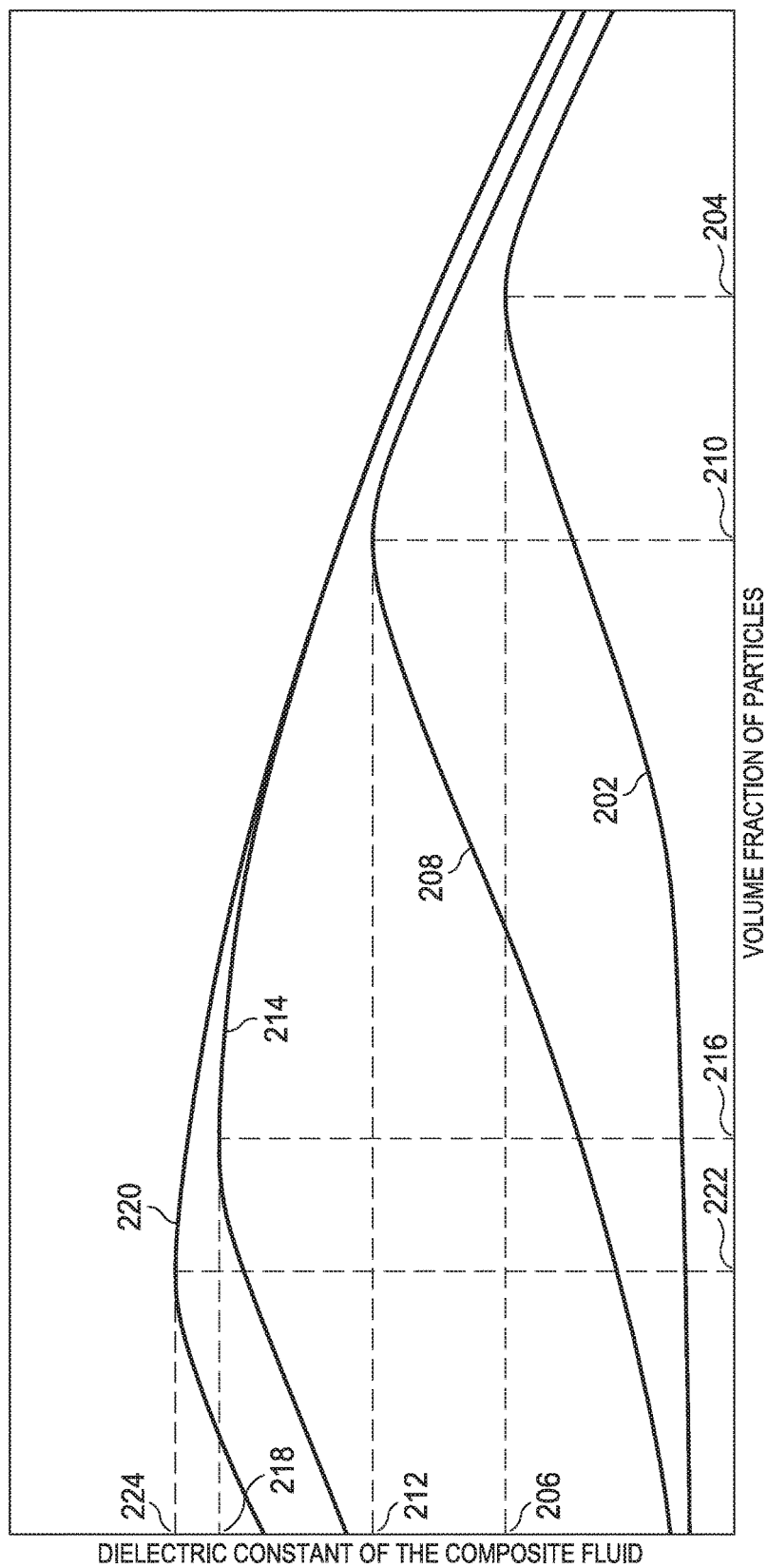
FIG. 2 is a graph illustrating the relationship between the dielectric constant of a composite fluid and the volume fraction of particles in the composite fluid for varying conductivities of the composite fluid.

FIG. 2 is a graph illustrating the relationship between the dielectric constant of a composite fluid and the volume fraction of particles in the composite fluid for varying conductivities of the composite fluid. Each of plots 202, 208, 214, and 220 represents a composite fluid with a different level of electrical conductivity. For example, plot 202 may represent the relationship between the dielectric constant of a composite fluid and the volume fraction of particles in the composite fluid where the conductivity of the composite fluid has not been increased through the addition of a conductive fluid to the foundation fluid. As illustrated by plot 202, the dielectric constant of the composite fluid may increase monotonically as the volume fraction of particles increases to volume fraction 204. The addition of particles beyond volume fraction 204, however, may result in a relative decrease in the dielectric constant of the composite fluid. Dielectric constant 206 may represent the maximum achievable dielectric constant for a composite fluid with the particular combination of foundation fluid and additives represented by plot 202. As illustrated later in FIG. 8, any increase in the dielectric constant of the composite fluid caused by increasing the volume fraction of particles may diminish with less conductive foundation fluids (e.g., $1e^{-09}$ mhos per meter).

Increasing the conductivity of the composite fluid through the addition of a conductive fluid to the foundation fluid may result in greater enhancement of the dielectric constant of the resulting composite fluid than would be achieved through the addition of particles alone. For example, plot 208 may represent the relationship between the dielectric constant of a composite fluid and the volume fraction of particles in the composite fluid where the conductivity of the composite fluid has been increased, relative to the fluid represented by plot 202, through the addition of a conductive fluid to the foundation fluid. Compared to plot 202, in which the fluid has a lower conductivity, plot 208 illustrates that, when the conductivity of the composite fluid is increased, a higher dielectric constant may be achieved without increasing the volume fraction of particles in the composite fluid. A peak in plot 208 at dielectric constant 212 may occur at volume fraction 210, representing the maximum dielectric constant for a composite fluid with the particular combination of foundation fluid and additives represented by plot 208. The maximum dielectric constant for plot 208 may be higher than the maximum dielectric constant for plot 202, and the peak in plot 208 may occur at a lower volume fraction of particles in the composite fluid compared to plot 202. This may be due at least in part to the increased conductivity of the fluid represented by plot 208. Thus, increasing the conductivity of the composite fluid may result in a greater enhancement of the dielectric constant for the composite fluid at a lower volume fraction of particles.

The relative increase in the dielectric constant of the composite fluid may, however, diminish as the conductivity of the fluid continues to increase. For example, plots 214 and 220 may represent composite fluids with conductivity levels greater than the fluids represented by plots 202 and 208. As illustrated by plots 214 and 220, the relative increase in the dielectric constant of the fluids represented by plots 214 and 220 is less than the relative increase in dielectric constant for the fluids represented by plots 202 and 208. Thus, the relative increase in maximum dielectric constants may diminish as the conductivity of the composite fluid continues to increase.

As illustrated by plots 202, 208, 214, and 220, a variety of techniques may be used to form a composite fluid with a desired dielectric constant. For example, the conductivity of the composite fluid may be increased through the addition of a conductive fluid to the foundation fluid, particles having a dielectric constant greater than that of the foundation fluid may be added to the foundation fluid, or a combination of these techniques may be employed. Different foundation fluids and additives may exhibit different responses to changes in the conductivity of the fluid and volume fractions of particles.

The decision on whether to increase the conductivity of the foundation fluid and/or add more particles may be based on the properties of the particular foundation fluid and/or additive(s) used, which may be obtained through analytical estimates, experimentation, or material specification sheets for the different materials, the desired properties of the composite fluid (e.g., the stability or lubricity of the resulting composite fluid), and/or other considerations, such as the dielectric strength of the composite fluid. For example, unlike the dielectric constant, the dielectric strength of a composite fluid may exhibit little or no correlation to the conductivity of the foundation fluid. Thus, while adding a conductive fluid to the foundation fluid may reduce the number of particles required to achieve a particular dielectric constant, the reduced number of particles may result in the formation of a composite fluid with a lower dielectric strength when compared to a composite fluid formed using only particles to obtain the same dielectric constant. If some compromise to the dielectric strength of composite fluid is acceptable (e.g., a reduction in the dielectric breakdown voltage from 30 kV/mm to 10 kV/mm), then a conductive fluid additive with particles having a greater dielectric constant than that of the foundation fluid combined with the conductive fluid additive may be used to enhance the dielectric constant of the resulting composite fluid. If however a composite fluid with a high dielectric strength is desirable, then the conductivity of the composite fluid may be kept as low as possible by using particles treated and/or created to have electric dipoles to increase the dielectric constant of the composite fluid as described in FIG. 3.

Figure 3:
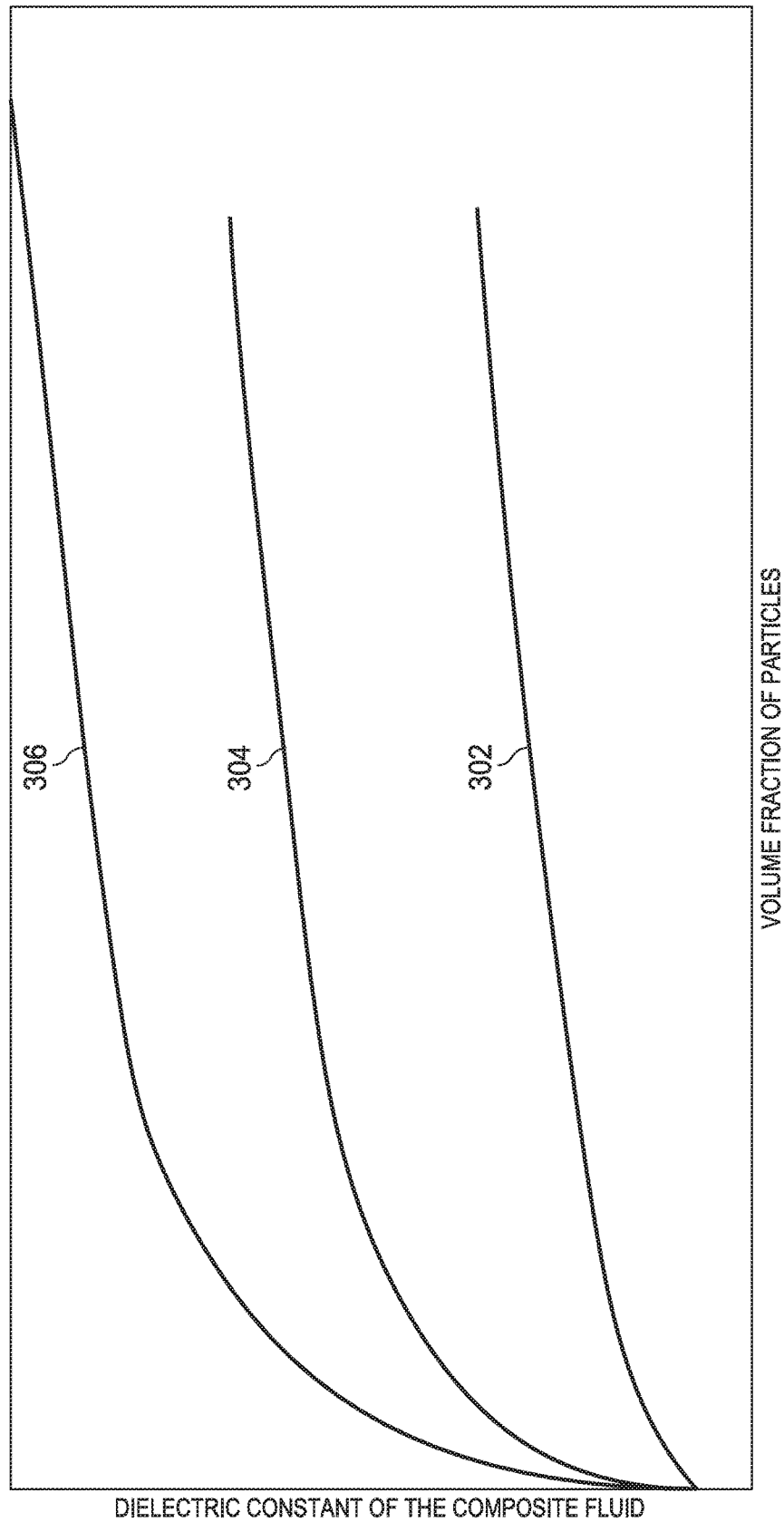
FIG. 3 is a graph illustrating the relationship between the dielectric constant of a composite fluid and the volume fraction of particles with varying electric dipole moments per unit volume.

FIG. 3 is a graph illustrating the relationship between the dielectric constant of a composite fluid and the volume fraction of particles with varying electric dipole moments per unit volume. The particles have a greater dielectric constant than the foundation fluid to which they are added. Adding particles with a dielectric constant greater than that of the foundation fluid may result in a composite fluid with a monotonically greater dielectric constant as a function of volume fraction of particles than that of the foundation fluid. However, the dielectric constant of the composite fluid may be considerably enhanced by treating and/or creating particles to have electric dipoles. In the presence of an electric field, the electric dipoles in the particles may align, increasing the polarity of the composite fluid to which the particles are added. The increased polarity of the composite fluid may result in an increased dielectric constant of the composite fluid. Each of plots 302, 304, and 306 represent a composite fluid including particles with varying electric dipole moments per unit volume.

For example, plot 302 represents a composite fluid including particles that have not been treated to impart electric dipoles or created with net electric dipole moments. As illustrated by plot 302, the dielectric constant of the composite fluid may increase monotonically as the volume fraction of particles having a dielectric constant greater than that of the foundation fluid are added. Even further enhancements to the dielectric constant of the composite fluid may be achieved by treating and/or creating the particles to have electric dipoles.

Plot 304 represents a composite fluid including particles that have been treated to impart quasi-permanent electric dipoles. Similar to plot 302, the dielectric constant of the composite fluid may increase as the volume fraction of the particles increases. When compared to plot 302, however, the dielectric constant of the composite fluid represented by plot 304 is greater for the same volume fraction of particles. This is due at least in part to the addition of particles treated to impart quasi-permanent electric dipoles. The increased electric dipole moment per unit volume may increase the dielectric constant of the particles, and thus the dielectric constant of the composite fluid to which the particles are added.

Like plot 304, plot 306 may represent a composite fluid including particles that have been treated to impart electric dipoles. The particles included in the composite fluid represented by plot 306 may, however, have an electric dipole moment per unit volume greater than the particles included in the composite fluid represented by plot 304. As illustrated by comparing plots 302, 304, and 306, increasing the electric dipole moment per unit volume of the particles included in a composite fluid may result in a greater enhancement of the dielectric constant for the composite fluid for the same volume fraction of particles. That is, as the electric dipole moment per unit volume of the particles increases, the dielectric constant of the composite fluid may also increase for the same volume fraction of particles.

The decision regarding whether to treat or create particles with electric dipoles may be based on the properties of the particular foundation fluid and/or additives used, which may be obtained through analytical estimates, experimentation, or material specification sheets for the different materials, the desired properties of the composite fluid (e.g., the stability or lubricity of the resulting composite fluid), and/or other considerations, such as the dielectric strength of the composite fluid. For example, although increasing the electric dipole moment per unit volume of the particles may reduce the amount of particles required to create a composite fluid having a particular dielectric constant, the dielectric strength of the composite fluid may exhibit little or no correlation to the dipole moment per unit volume of the particles. Thus, using fewer particles to obtain the same dielectric constant in the composite fluid may result in the formation of a composite fluid with a lower dielectric strength when compared to a composite fluid formed using only particles to obtain the same dielectric constant.

Electrical Properties Examples

Various analyses were conducted to demonstrate the effect of additives on the resulting composite fluid. Unless stated otherwise, the foundation fluid is ethyl amine with a dielectric constant of twice that of a vacuum and a conductivity of $4 \times 10^{-5}$ mhos per meter, the operating frequency of the electric field applied to the composite fluid is 200 Hertz, and the additive particles are disk shaped and comprised with a conductivity of $10^{-5}$ mhos per meter in the case of mica. The analyses were conducted for a limited range of volume fractions of additive particles as labeled in the individual figures described below.

Figure 4:
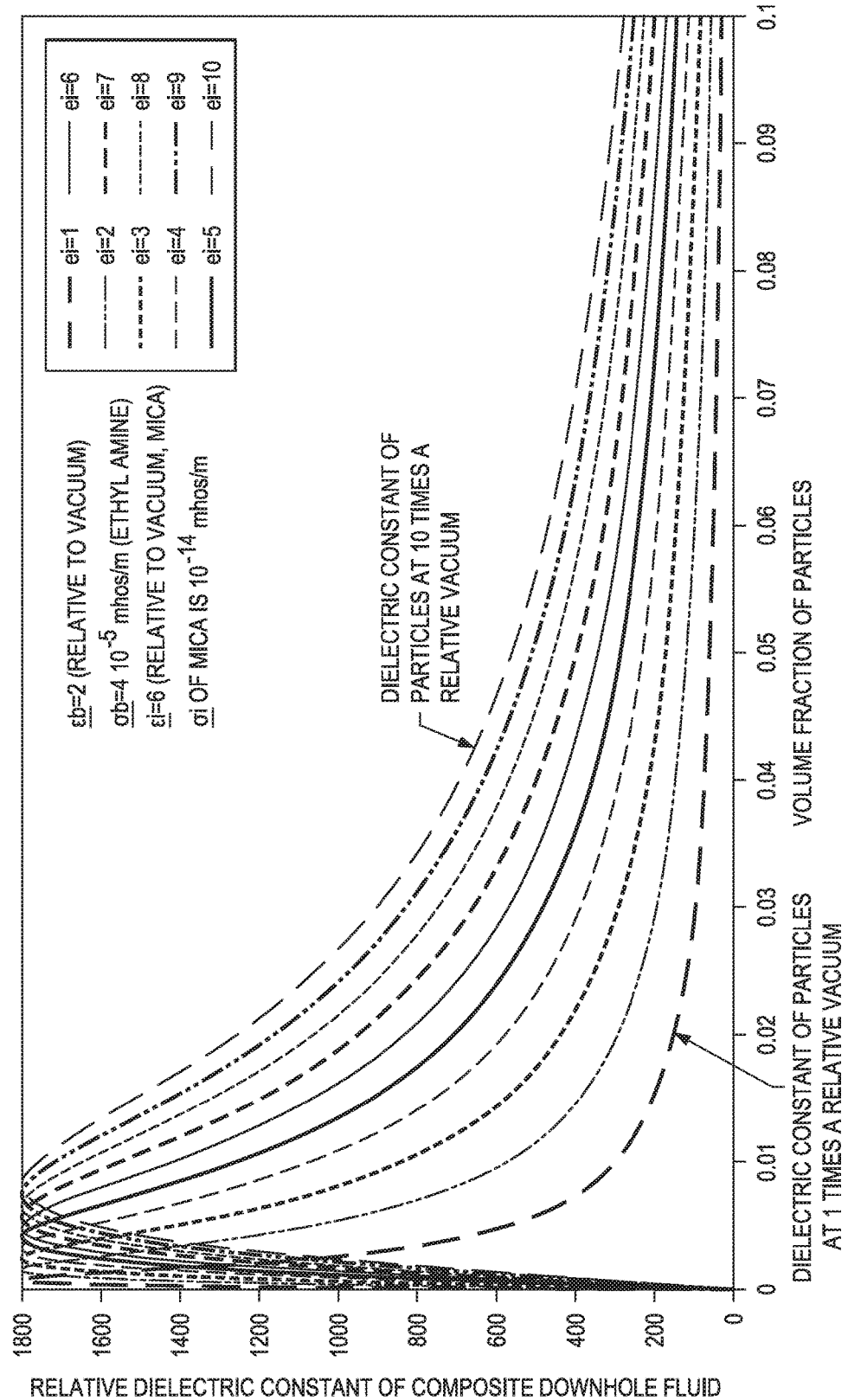
FIG. 4 is a graph illustrating the relationship between the dielectric constant of a composite fluid and the volume fraction of additive particles with varying dielectric constants.

FIG. 4 is a graph illustrating the relationship between the dielectric constant of a composite fluid and the volume fraction of additive particles with varying dielectric constants. As illustrated, the peak in the dielectric constant of the composite fluid occurs where the volume fraction of the additive particles is low (e.g., less than 0.01) and there is little variation in the highest obtainable dielectric constant of the composite fluid based on the dielectric constant of the additive particles. As the dielectric constant of the particles increases, the width of the peak corresponding to the dielectric constant of the composite fluid increases to spread over a wider range of volume fractions of particles. Thus, particles with a greater dielectric constant may improve the stability of the dielectric constant of the composite fluid caused by fluctuations in the volume fractions of particles.

Figure 5:
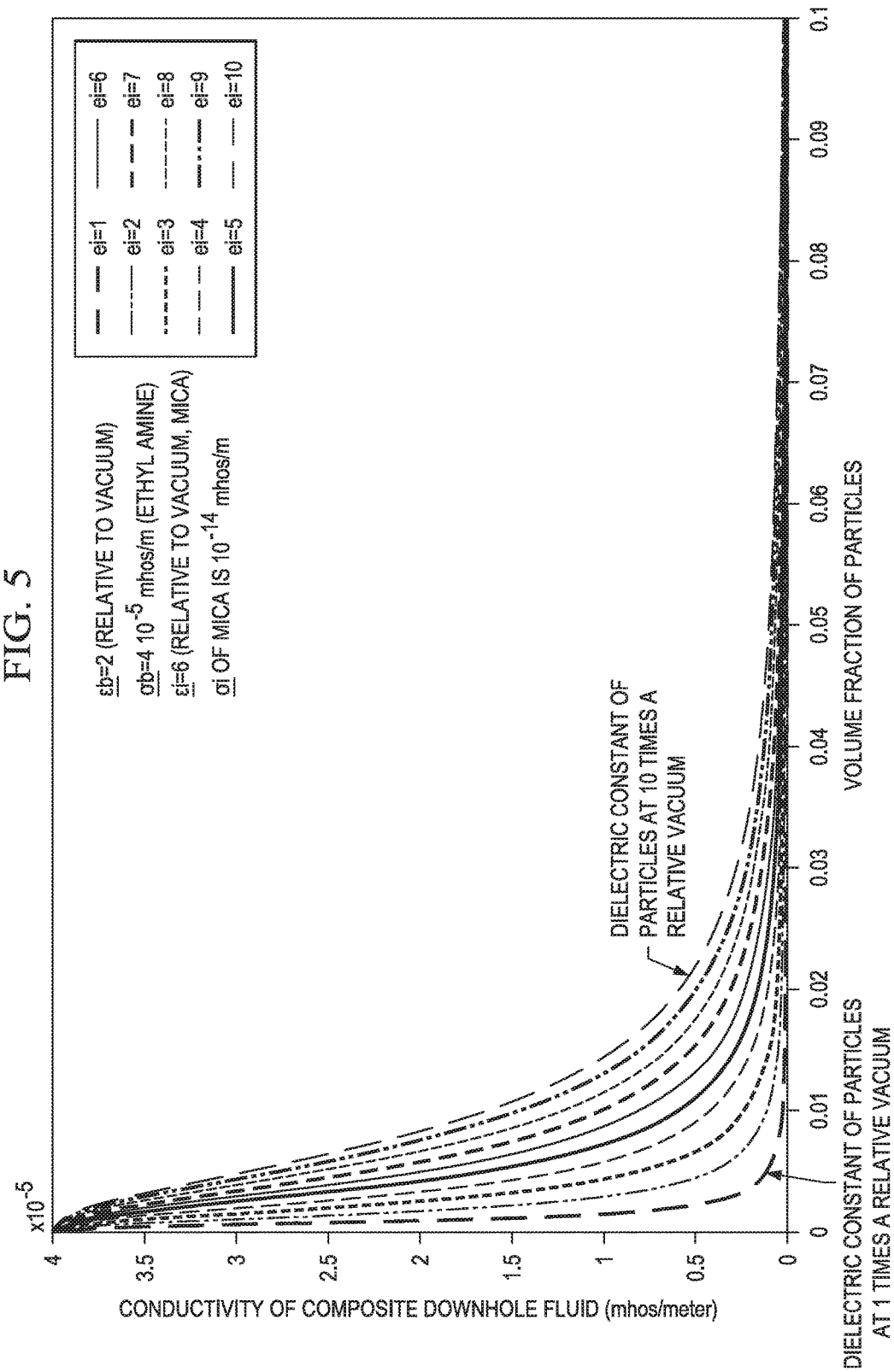
FIG. 5 is a graph illustrating the relationship between the conductivity of a composite fluid and the volume fraction of additive particles with varying dielectric constants.

FIG. 5 is a graph illustrating the relationship between the conductivity of a composite fluid and the volume fraction of additive particles with varying dielectric constants. As illustrated, the effective conductivity of the composite fluid decreases rapidly as the volume fraction of additive particles in the composite fluid increases. The dielectric constant of the additive particles and the change in conductivity of the composite fluid may be inversely related. For example, the addition of particles with a greater dielectric constant may decrease the conductivity of the composite fluid less than the addition of particles with a lesser dielectric constant. Thus, the greater the dielectric constant of the additive particles, the less the additive particles reduce the conductivity of the composite fluid.

Figure 6:
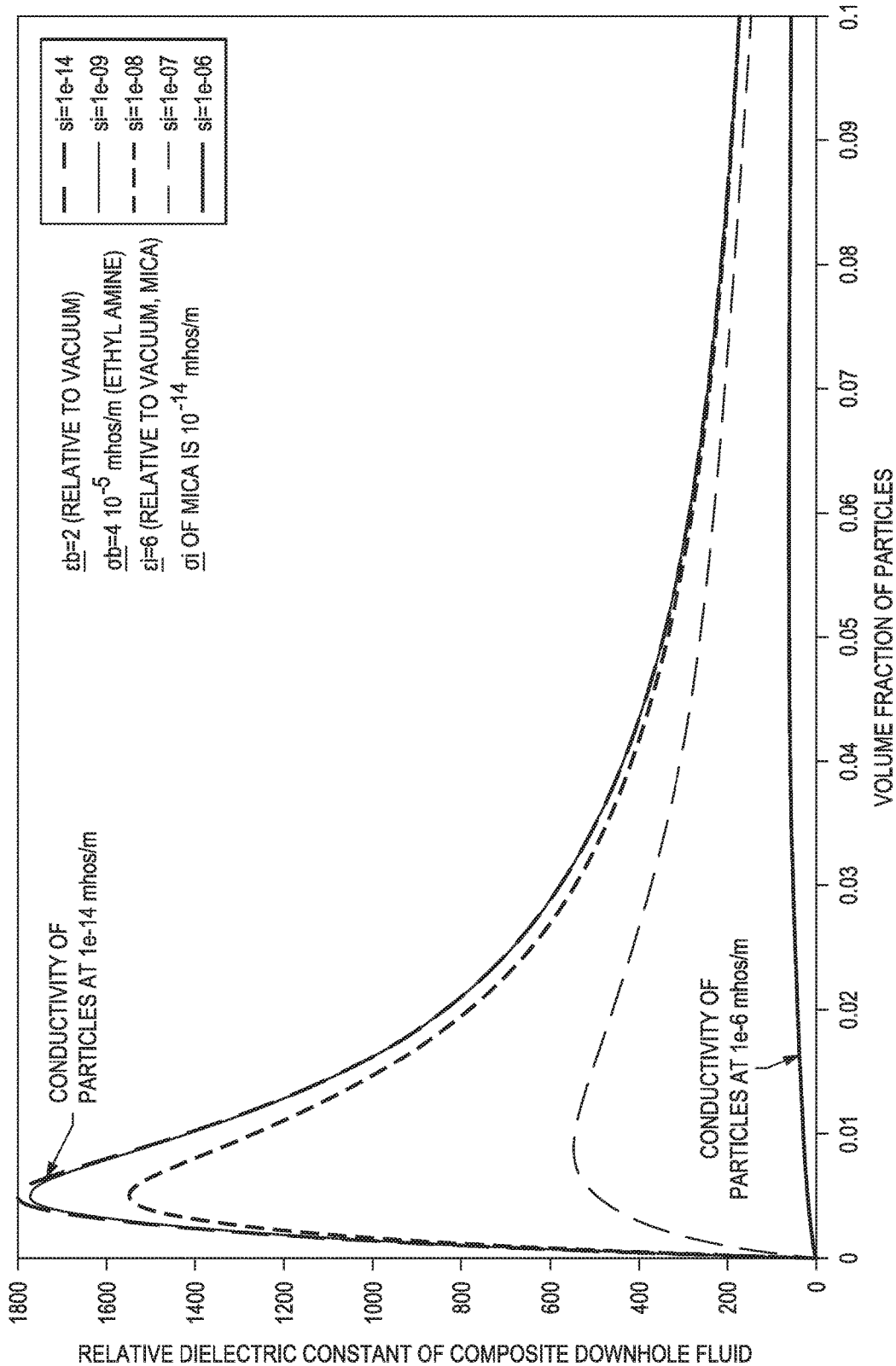
FIG. 6 is a graph illustrating the relationship between the dielectric constant of a composite fluid and the volume fraction of additive particles with varying conductivities.

FIG. 6 is a graph illustrating the relationship between the dielectric constant of a composite fluid and the volume fraction of additive particles with varying conductivities of the additive particles. The conductivity of the additive particles (e.g., the conductivity of the composition from which the particles are comprised) may have little effect on the dielectric constant of the composite fluid. However, as the conductivity of the additive particles increases to, for example, one half the conductivity of the foundation fluid, any increase to the dielectric constant of the composite fluid caused by the addition of the additive particles may diminish, even as the volume fraction of the additive particles is increased. Thus, additive particles with a low conductivity (e.g., less than one half that of the foundation fluid) should be used in order to achieve a greater enhancement to the dielectric constant of the composite fluid.

Figure 7:
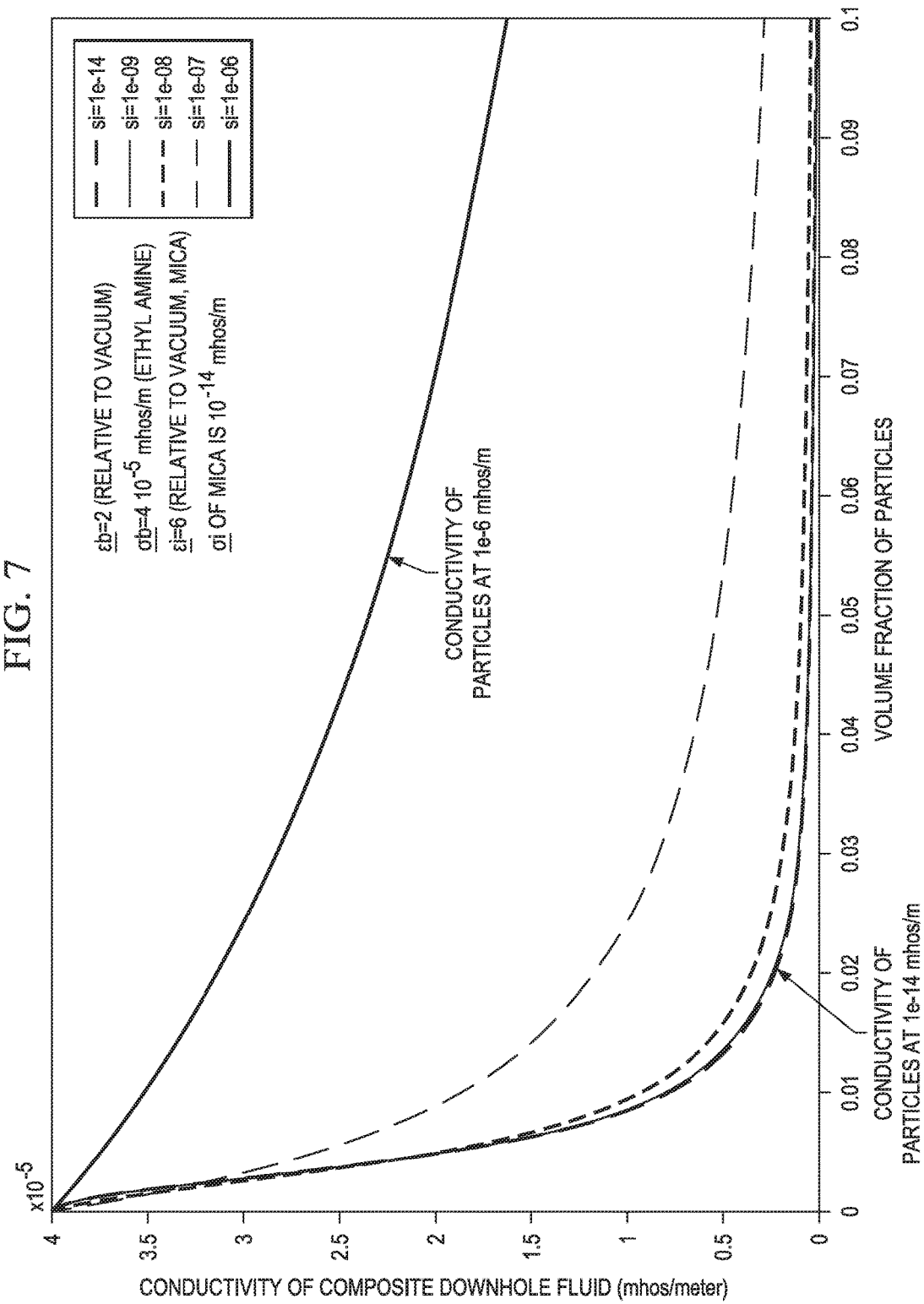
FIG. 7 is a graph illustrating the relationship between the conductivity of a composite fluid and the volume fraction of additive particles with varying conductivities.

FIG. 7 is a graph illustrating the relationship between the conductivity of a composite fluid and the volume fraction of additive particles with varying conductivities of the composition from which the particles are comprised. As the conductivity of the additive particles (e.g., the conductivity of the composition from which the particles are comprised) increases, the conductivity of the composite fluid experiences greater increases in conductivity because of the additive particles. Considering FIGS. 6 and 7 in combination, it may be desirable to utilize additive particles having low conductivities (e.g., less than one half that of the foundation fluid) to ensure that the enhanced dielectric constant and the low conductivity of the composite fluid are not adversely affected by the conductivity of the additive particles.

Figure 8:
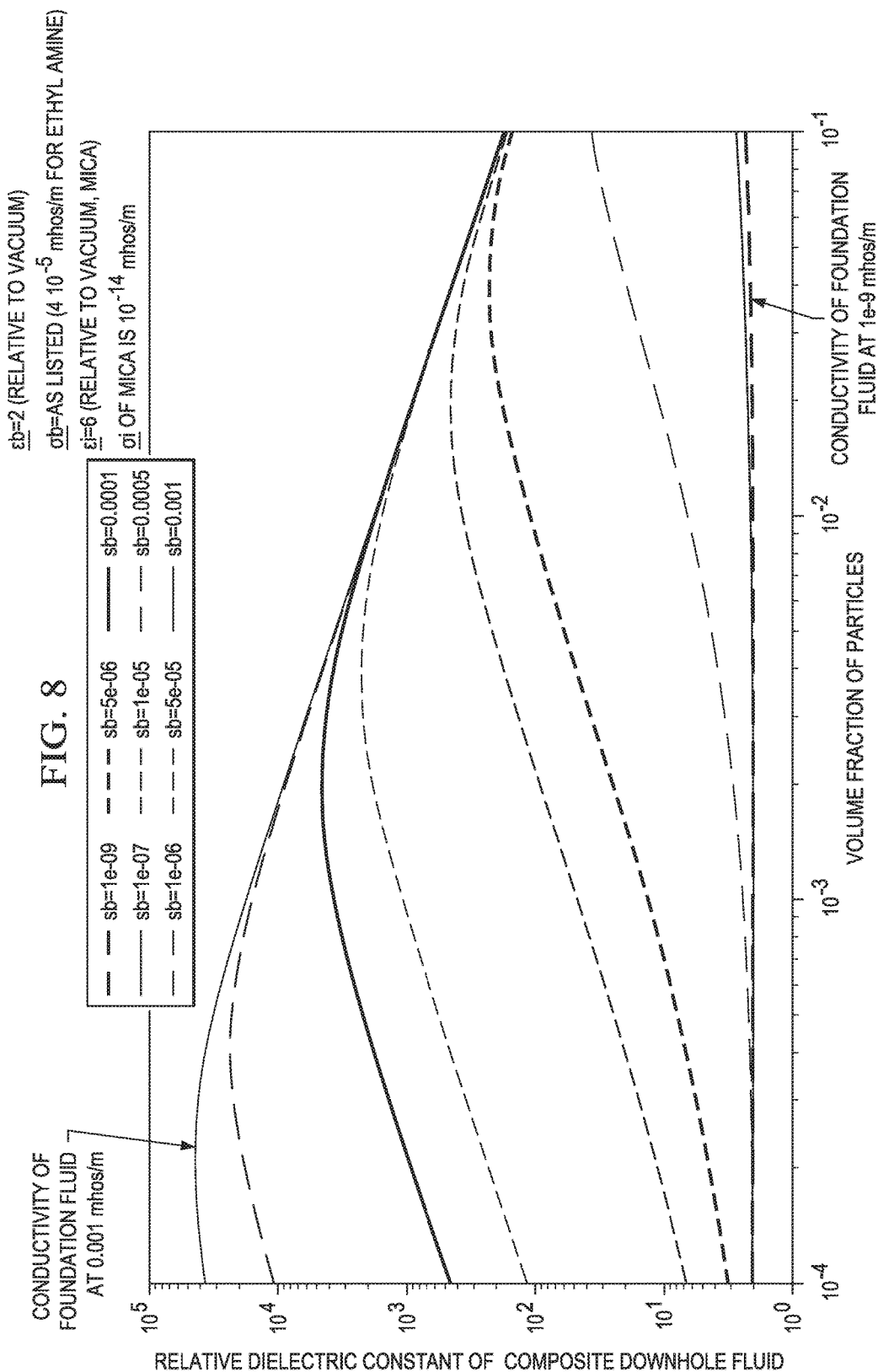
FIG. 8 is a graph illustrating the relationship between the dielectric constant of a composite fluid and the volume fraction of additive particles in the composite fluid for varying conductivities of the composite fluid.

FIG. 8 is a graph illustrating the relationship between the dielectric constant of a composite fluid and the volume fraction of additive particles in the composite fluid for varying conductivities of the composite fluid. The enhancement to the dielectric constant of the composite fluid may be greater for the same volume fraction of additive particles as the conductivity of the foundation fluid is increased. As the conductivity of the foundation fluid is increased, greater enhancement to the dielectric constant of the composite fluid may be achieved with a lesser volume fraction of additive particles. Thus, increasing the conductivity of the foundation fluid may increase the dielectric constant in the composite fluid. However, as the conductivity of the foundation fluid reaches approximately 0.0005 or 0.001 mhos per meter, the relative enhancement to the dielectric constant of the composite fluid ceases with further increases to the conductivity of the foundation fluid. That is, as the conductivity of the foundation fluid reaches a certain value, further increases to the conductivity of the foundation fluid may have diminishing effects on the dielectric constant of the composite fluid.

Figure 9:
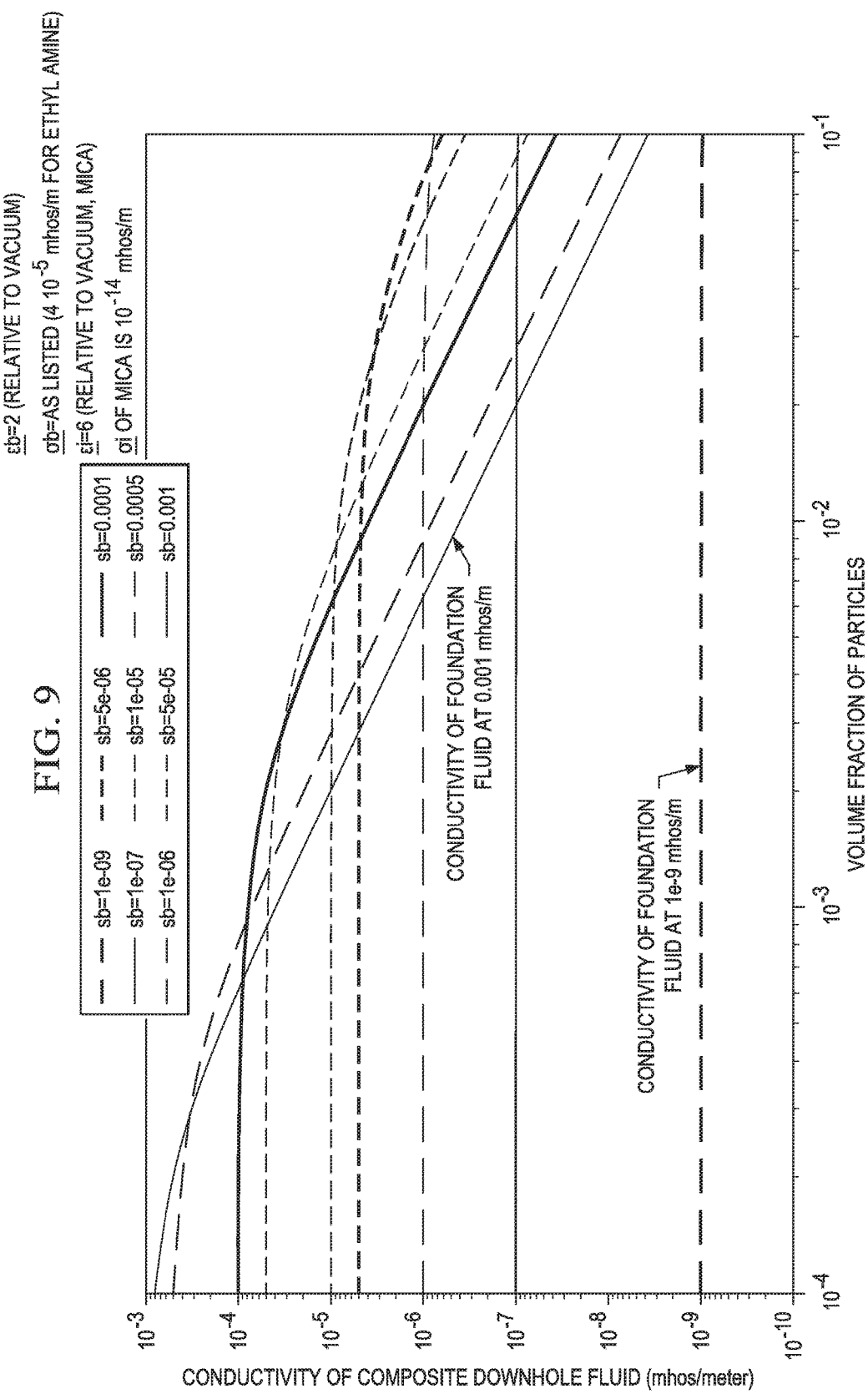
FIG. 9 is a graph illustrating the relationship between the conductivity of a composite fluid and the volume fraction of additive particles in the composite fluid for varying conductivities of the foundation fluid.

FIG. 9 is a graph illustrating the relationship between the conductivity of a composite fluid and the volume fraction of additive particles in the composite fluid for varying conductivities of the foundation fluid. Until the conductivity of the foundation fluid is relatively high (e.g., five or more orders of magnitude greater than the composite fluid), the additive particles have little effect on the conductivity of the resulting composite fluid. Above this ratio, as the conductivity of the foundation fluid increases, the volume fraction of additive particles required to decrease the conductivity of the resulting composite fluid also increases.

Figure 10:
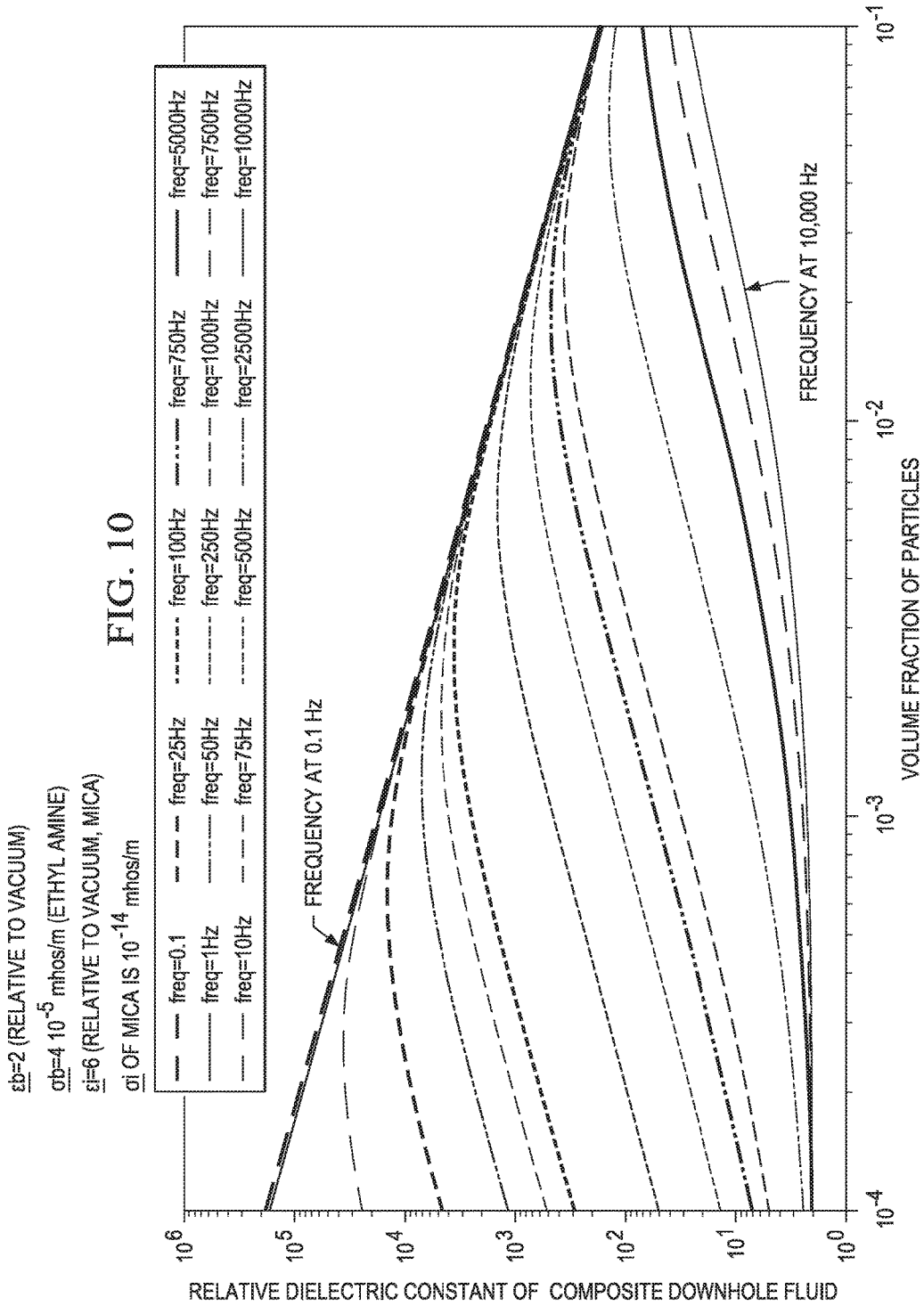
FIG. 10 is a graph illustrating the relationship between the dielectric constant of a composite fluid and the operating frequency of the electric potential or field.

FIG. 10 is a graph illustrating the relationship between the dielectric constant of a composite fluid and the operating frequency of the electric potential or field. The dielectric constant and/or dielectric strength of the composite fluid may change based on the frequency of the electric potential or fields exerted on the fluid. For example, as the frequency of the electric potential applied to the composite fluid increases, the relative increase to the dielectric constant of the composite fluid monotonically decreases. Thus, enhancement to the dielectric constant of the composite fluid may be higher at lower operating frequencies, and decrease as the frequency of the electric potential increases.

Figure 11:
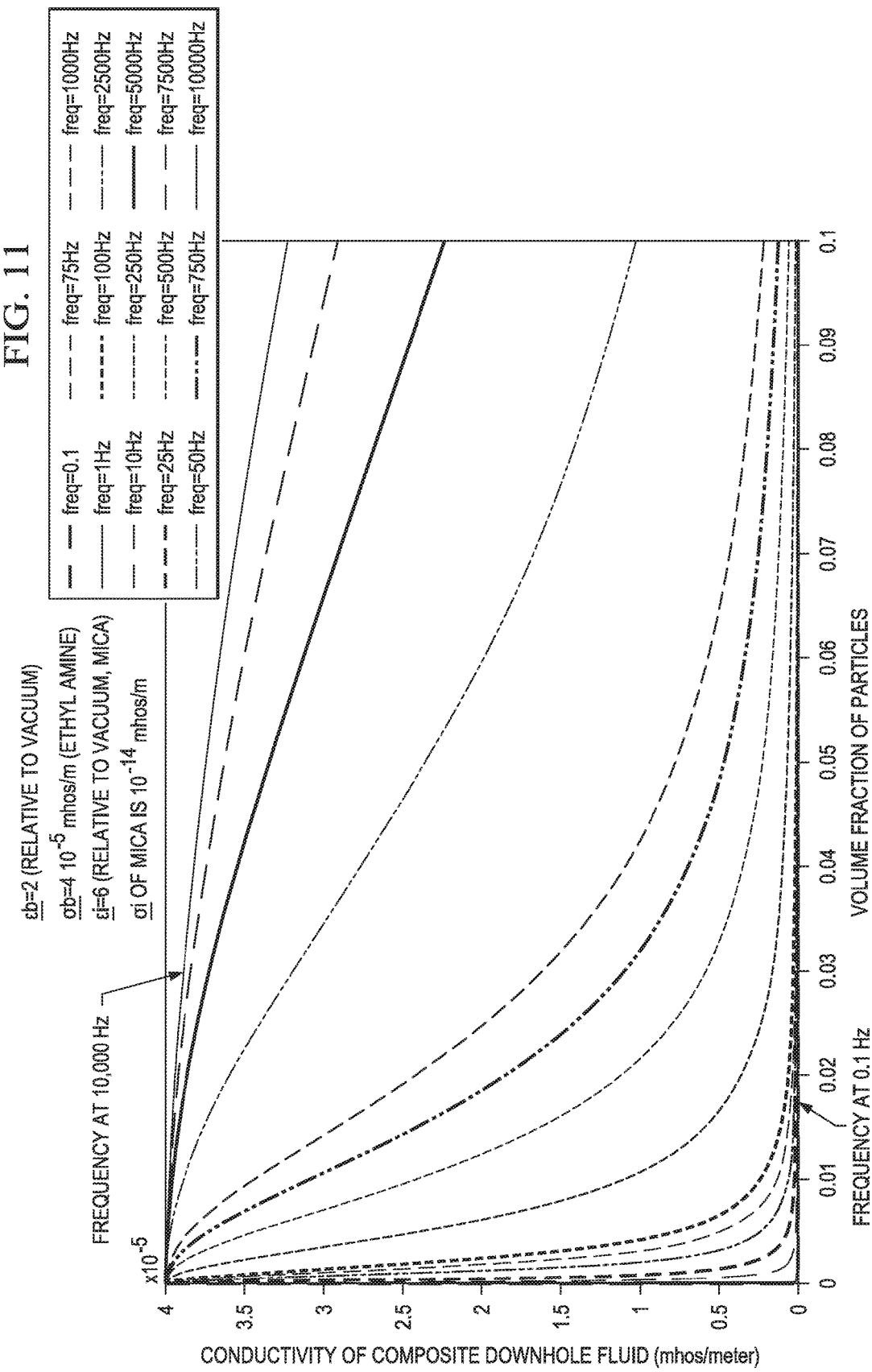
FIG. 11 is a graph illustrating the relationship between the effective conductivity of the composite fluid and the volume fraction of additive particles with varying operating frequencies of the electric potential.

FIG. 11 is a graph illustrating the relationship between the effective conductivity of the composite fluid and the volume fraction of additive particles with varying operating frequencies of the electric potential. Similar to the dielectric constant and/or dielectric strength, the conductivity of the composite fluid may vary with the operating frequency of the electric potential. The effective conductivity of the composite material increases relatively uniformly as the frequency of the electric potential increases.

Figure 12:
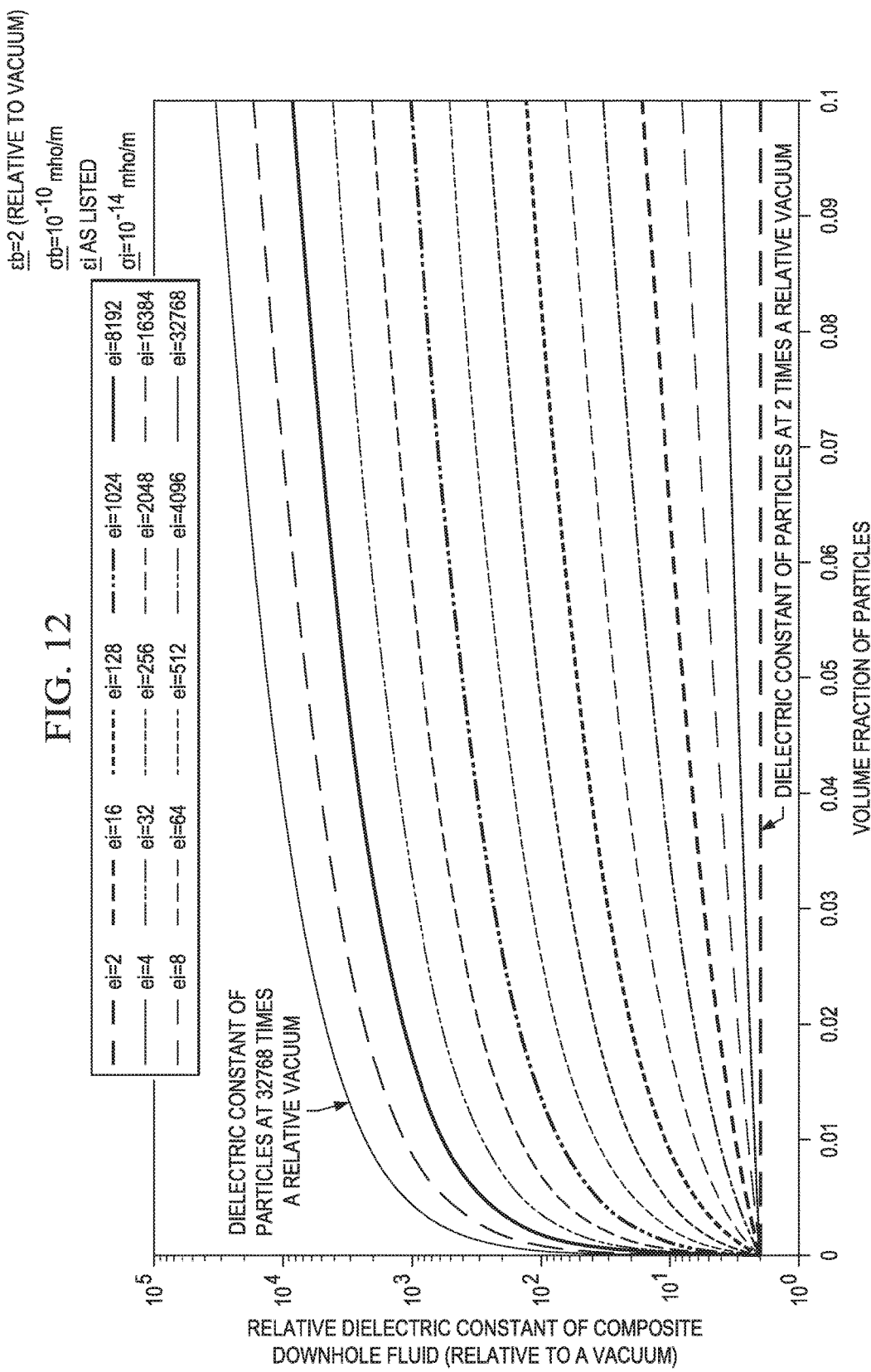
FIG. 12 is a graph illustrating the relationship between the dielectric constant of a composite fluid and the volume fraction of additive particles with varying dielectric constants enhanced by increasing the electric dipole moment per unit volume of the additive particles.

FIG. 12 is a graph illustrating the relationship between the dielectric constant of a composite fluid and the volume fraction of additive particles with varying dielectric constants enhanced by increasing the electric dipole moment per unit volume of the additive particles. The foundation fluid in FIG. 12 has a relatively low conductivity of $10^{-10}$ mhos per meter. As the dielectric constant of the additive particles is increased by, for example, increasing the electric dipole moment per unit volume of the particles, the dielectric constant of the composite fluid to which the particles are added increases as well. As the volume fraction of particles exceeds the plotted 0.01 and approaches 1.0, the dielectric constant of the composite fluid asymptotically approaches the dielectric constant of the additive particles. As the conductivity of the composite fluid decreases, the volume fraction of additive particles will have a diminishing effect on the dielectric constant of the composite fluid.

Magnetic Properties

The magnetic properties of a downhole fluid may also affect how system components located within the wellbore interact with one another, the wellbore, and the surrounding formation. The magnetic properties of a downhole fluid bear many similarities to the electrical properties discussed above. For example, the magnetic permeability of a downhole fluid is the magnetic equivalent of the dielectric constant of the downhole fluid. Similarly, the magnetic reluctance of a downhole fluid is the magnetic equivalent electrical resistance, or the reciprocal of electrical conductivity. Thus, techniques similar to those described above for creating a composite fluid with particular electrical properties may be used to create a composite fluid with particular magnetic properties.

The downhole fluid may be a composite fluid including a foundation fluid to which particles and/or other fluids, which may collectively be referred to as "additives," are added to create a new composite fluid with magnetic properties different than those of the foundation fluid. A foundation fluid may be provided as the starting product for the formation of a composite fluid. The foundation fluid has a magnetic permeability, which may represent the density of magnetic flux in response to the magnetic field, or the degree of magnetization of the fluid in response to a magnetic field.

The foundation fluid may include a single fluid or a combination of more than one fluid. The components of the foundation fluid may be synthetically produced or refined from naturally occurring materials with electrically insulating properties. Further, the components of the foundation fluid may be selected to withstand a range of temperatures and pressures typical within a wellbore. For example, non-aqueous, oil-based fluids may withstand higher temperatures and higher pressures before breaking down as compared to other aqueous fluids. As an example, the foundation fluid may be formed of compounds including branched-chain paraffins having between approximately 18 and 40 carbon atoms per molecule, diester oils, hydrocarbon liquids substantially immiscible with water, oleaginous fluids (e.g., esters, olefins, diesel oils, and mineral oils including n-paraffins, iso-paraffins, cyclic alkanes, and/or branched alkanes), low polynuclear aromatic oils with a mixture of branched and cyclic paraffins, asphaltic mineral oils, and/or asphaltic residual fuel oils, and combinations thereof.

One or more additives may be selected to add to the foundation fluid to form a composite fluid with different magnetic properties than those of the foundation fluid. Additives may be selected such that, when combined with the foundation fluid, the addition of additives results in the formation of a composite fluid with a magnetic permeability approximately equal to a target value or within a target range. The target value or range may be different from the value or range of the magnetic permeability of the foundation fluid. For example, one or more additives may be selected to be added to the foundation fluid to create a composite fluid with a magnetic permeability greater than that of the foundation fluid. One or more additives may also be selected to be added to the foundation fluid or composite fluid to create a composite fluid with a magnetic permeability less than the foundation fluid.

Additives may include particles, fluids, and combinations thereof. For example, an additive may include particles formed of a composition having a magnetic permeability greater than that of the foundation fluid or particles with magnetic dipoles. As an example, additives may be formed of a mixture of different particles where each type of particle is formed of a composition having a magnetic permeability greater than that of the foundation fluid. As another example, an additive may be formed of particles treated in the presence of a magnetic field and a high temperature (e.g., a temperature beyond the melting point of the composition from which the particles are formed) to create magnetic dipoles in the particles. As yet another example, an additive may include Janus particles created with two regions that are magnetically polarized. The addition to the foundation fluid of particles with a magnetic permeability greater than that of the foundation fluid and/or particles treated or created with magnetic dipoles may result in the formation of a composite fluid with a magnetic permeability greater than that of the foundation fluid.

Exemplary compositions from which the particles may be formed include mica in any of its various forms containing natural ferritic inclusions, ferrite materials (e.g., manganese-zinc ferrite made of the form $Mn_aZn_{(1-a)}Fe_2O_4$, and nickel-zinc ferrite made of the form $Ni_aZn_{(1-a)}Fe_2O_4$), and/or particles of magnetic materials, such as iron, nickel, and/or cobalt, and combinations thereof.

The size of the particles may be selected to be larger than the chemical compounds of the material(s) from which the particles are formed, yet small enough to ensure a random, uniform distribution within the composite fluid. For example, particles in the shape of flakes with a diameter between approximately 10 nm and 100,000 nm may uniformly distribute into the composite fluid such that all portions of composite fluid maintain a relatively uniform magnetic permeability. The particles may also be in the shape of needles, ellipsoids, spheres, and combinations thereof. As the size of the particles increases, the distribution of the particles within the composite fluid may vary, which may cause variations in the magnetic permeability throughout the composite fluid.

As another example, an additive may include foundation fluid. For example, if the magnetic permeability of a composite fluid becomes greater than the target value or range following the addition of one or more additives, additional foundation fluid may be added to dilute the composite fluid and thus reduce the magnetic permeability of the composite fluid.

Analytical estimates may be used to select the additive(s) added to the foundation fluid in order form a composite fluid with a magnetic permeability approximately equal to the target value or within the target range. These methods may take into account the properties (e.g., magnetic permeability) of the additive(s) and the foundation fluid, and the properties of any other components in the composite fluid. Analytical estimates may also take into account conditions in which the composite fluid will be used and what effect those conditions will have on the magnetic properties of the composite fluid. For example, the magnetic permeability of the composite fluid may change based on the frequency of the magnetic fields exerted on the fluid or the temperature of the fluid.

The additives may be added to the foundation fluid to form a composite fluid with different magnetic properties than those of the foundation fluid. The amount of an additive to be added to the foundation fluid may be selected such that the combination of the additive and the foundation fluid result in the formation of a composite fluid with a magnetic permeability approximately equal to a target value or within a target range. The amount of an additive added to the foundation fluid may affect the magnetic permeability of the resulting composite fluid. For example, increasing the amount of an additive added to the foundation fluid may result in an increase in the magnetic permeability of the resulting composite fluid. The amount of an additive necessary to form a composite fluid with a magnetic permeability approximately equal to the target value or within the target range may vary depending on, for example, the volume fraction of the additive, the magnetic permeability of the additive and foundation fluid, the magnetic permeability of the additive and foundation fluid, and/or the conditions within the wellbore. If the magnetic permeability of the resulting composite fluid is not approximately equal to the target value or within the target range, then additional additives may be selected and added to the fluid.

Additives may be added to the foundation fluid at the well site or may be added to the foundation fluid before the foundation fluid is brought to the well site. For example, particles may be added to the foundation fluid via mixing hopper 134 (shown in FIG. 1) before the fluid is pumped into the wellbore. As another example, particles may added to a container in which the foundation fluid is stored (e.g., retention pit 132 shown in FIG. 1) such that the additives are mixed into the foundation fluid as the fluid is pumped into the wellbore. As yet another example, the additives may be placed into the wellbore and mixed with the foundation fluid as the fluid circulates within the wellbore. As still another example, additives may be added to the foundation fluid during the manufacture and/or preparation of the composite fluid.

Impedance Matching with Downhole Fluids

Using the teachings of the present disclosure, a downhole fluid may be formed with any combination of electrical and/or magnetic properties. For example, a downhole fluid may be formulated to have a particular dielectric constant, dielectric strength, electrical conductivity, and/or magnetic permeability. One or more additives may be added to a foundation fluid to create a composite fluid with particular electrical and/or magnetic properties or added to an existing fluid to change the electrical and/or magnetic properties of the existing fluid. The additives may include, for example, a conductive fluid, additional foundation fluid, particles having particular electrical and/or magnetic properties, including particles with electric dipoles, and/or particles with magnetic dipoles, and combinations thereof.

Control of both the electrical and magnetic properties of a fluid may be useful for, among other things, impedance matching. The impedance of any composition may be a function of the capacitance, inductance, and/or resistance of the composition. Capacitance relates to the dielectric constant of a composition, such that increasing the dielectric constant of the composition may increase its capacitance. Inductance relates to the magnetic permeability of the composition, such that increasing the magnetic permeability of the composition may increase its inductance. Resistance relates to the conductivity of the composition, such that increasing the conductivity of the composition may decrease its resistance. Thus, the impedance of a fluid may be controlled by adjusting the dielectric constant, magnetic permeability, and/or conductivity of the fluid. To achieve impedance matching, the source impedance may be adjusted to approximately match the load impedance, or vice versa as described in more detail below. Because impedance may vary by frequency, impedance matching may account for the operating frequency of the electric and magnetic fields within the wellbore.

As an example, in electric discharge drilling, the power transfer of the drill may be maximized by matching the impedance of the electric discharge drill bit to the impedance of the formation. Matching the impedance of the drill bit to the formation may minimize energy loss in the downhole fluid or electrical signal reflection at high frequencies (e.g., greater than 10 megahertz), and thus maximize the power transfer from the drill bit to the formation. Maximizing the power transfer from the electric discharge drill to the targeted region of the formation may affect the efficiency and cost of drilling. A downhole fluid may be in contact or surround system components within the wellbore (including the drill bit), such that the effective impedance of the system components may be affected by the impedance of the downhole fluid. Thus, the downhole fluid may be used to change the effective impedance of a system component serving as a source and/or load of an electrical system. Additives may be used to control the dielectric constant, electrical conductivity, and/or magnetic permeability of the downhole fluid, and thus the effective impedance of the system components, including the drill bit that the downhole fluid surrounds. Therefore, the additives to a downhole fluid may be used to change the effective impedance of the drill bit to match the impedance of the formation, thereby matching the source and load impedances of the electric discharge drilling system.

As another example, the impedance of a downhole fluid may be used to minimize the borehole effect on electromagnetic logging tools operating within the wellbore. Variations in the wellbore may affect the accuracy of measurements made by electromagnetic logging tools (e.g., lateral resistivity tools, induction resistivity tools, propagating wave resistivity tools, pulsed resistivity tools, nuclear magnetic resonance tools, and measurement tools) operating within the wellbore in what is commonly referred to as the borehole effect. The impedance of the downhole fluid may be adjusted to approximately match the impedance of a formation surrounding the wellbore to the impedance of the wellbore, thereby reducing the borehole effect and increasing the accuracy of measurements made by electromagnetic logging tools.

The impedance of the downhole fluid may be adjusted over time to maintain impedance matching. For example, the impedance of the formation surrounding a wellbore may change as drilling progresses. Different regions of the formation may contain different fluids, such as oil, gas, and water, dispersed among varying porous formations, such as sandstone and/or shale. As the content of the formation changes, so may the impedance of the formation. Monitoring equipment, such as electromagnetic monitoring sensors, placed at or near the drill bit may be used to monitor the impedance of the formation. Similarly, cuttings from the formation may be tested at the well surface to determine the impedance of a region of the formation. Upon detecting impedance changes in the formation, the well operator may add additives to the downhole fluid to adjust the impedance of the downhole fluid, to for example, change the effective impedance of the drill bit to match that of the formation in electric discharge drilling or change the effective impedance of the wellbore to match that of the formation for electromagnetic logging. As the new downhole fluid reaches the drill bit, the effective electrical impedance of the drill bit may adjust to match the impedance of the formation. Thus, the downhole fluid may be modified or reformulated over time to adjust to impedance changes that may occur within the drilling system. Maintaining the impedance matching over time may maximize the power transfer from the electric discharge drill, improving the efficiency and cost of drilling. Further, managed pressure drilling techniques may be used to maintain more than one downhole fluid within the same wellbore. Placing different downhole fluids within different regions of the same wellbore may allow for higher precision impedance matching if the impedance of the formation varies at different regions of the wellbore. As an example, different downhole fluids may be placed in the different regions of the wellbore to match the particular impedance of the formation surrounding the region of the wellbore where the fluid is located.

Uses and Delivery Methods for Downhole Fluids

Drilling Fluid

As disclosed in FIG. 1, drilling fluids, including those formulated and/or modified according to the teachings of the present disclosure, may be used in drilling a wellbore. A drill bit may be mounted on the end of a drill string that may include several sections of drill pipe. The drill bit may be used to extend the wellbore, for example, by the application of force and torque to the drill bit. The drilling fluid may be circulated downwardly through the drill pipe, through the drill bit, and upwardly through the annulus between the drill pipe and the formation to the surface. Other methods of circulation are possible. The drilling fluid may be employed for general drilling of a wellbore in subterranean formations, for example, through non-producing zones as well as for drilling through hydrocarbon-bearing producing zones. The drilling fluids may directly or indirectly affect one or more components or pieces of equipment associated with the preparation, delivery, recapture, recycling, reuse, and/or disposal of the disclosed drilling fluid. For example, the disclosed drilling fluid may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the exemplary drilling fluid. The drilling fluid may also affect transport or delivery equipment used to convey the drilling fluid to a well site or downhole such as, for example, any transport vessels, conduits, pipelines, trucks, tubulars, and/or pipes used to compositionally move the drilling fluid from one location to another, any pumps, compressors, or motors (e.g., topside or downhole) used to drive the drilling fluid into motion, any valves or related joints used to regulate the pressure or flow rate of the drilling fluid, and any sensors (i.e., pressure and temperature), gauges, and/or combinations thereof, and the like. The drilling fluid may also directly or indirectly affect the various downhole equipment and tools that may come into contact with the drilling fluid such as, but not limited to, wellbore casing, wellbore liner, completion string, insert strings, drill string, coiled tubing, slickline, wireline, drill pipe, drill collars, mud motors, downhole motors and/or pumps, spacer fluid pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Spacing Fluids

Spacer fluids, including those formulated and/or modified according to the teachings of the present disclosure, may directly or indirectly affect one or more components or pieces of equipment associated with the preparation, delivery, recapture, reuse, recycling, and/or disposal of the disclosed spacer fluid. For example, the spacer fluid may affect one or more mixers, related mixing equipment, mud pits, storage facilities or units, composition separators, heat exchangers, sensors, gauges, pumps, compressors, and the like used to generate, store, monitor, regulate, and/or recondition the exemplary spacer fluid. The spacer fluid may also affect any transport or delivery equipment used to convey the spacer fluid to a well site or downhole such as, for example, any transport vessels, conduits, pipelines, trucks, tubulars, and/or pipes used to compositionally move the spacer fluid from one location to another, any pumps, compressors, or motors (e.g., topside or downhole) used to drive the spacer fluid into motion, any valves or related joints used to regulate the pressure or flow rate of the spacer fluid, and any sensors (i.e., pressure and temperature), gauges, and/or combinations thereof, and the like. The spacer fluid may also affect the various downhole equipment and tools that may come into contact with the spacer fluid such as, but not limited to, wellbore casing, wellbore liner, completion string, insert strings, drill string, coiled tubing, slickline, wireline, drill pipe, drill collars, mud motors, downhole motors and/or pumps, spacer fluid pumps, surface-mounted motors and/or pumps, centralizers, turbolizers, scratchers, floats (e.g., shoes, collars, and valves), logging tools and related telemetry equipment, actuators (e.g., electromechanical devices, and hydromechanical devices), sliding sleeves, production sleeves, plugs, screens, filters, flow control devices (e.g., inflow control devices, autonomous inflow control devices, and outflow control devices), couplings (e.g., electro-hydraulic wet connect, dry connect, and inductive coupler), control lines (e.g., electrical, fiber optic, and hydraulic), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Figure 13:
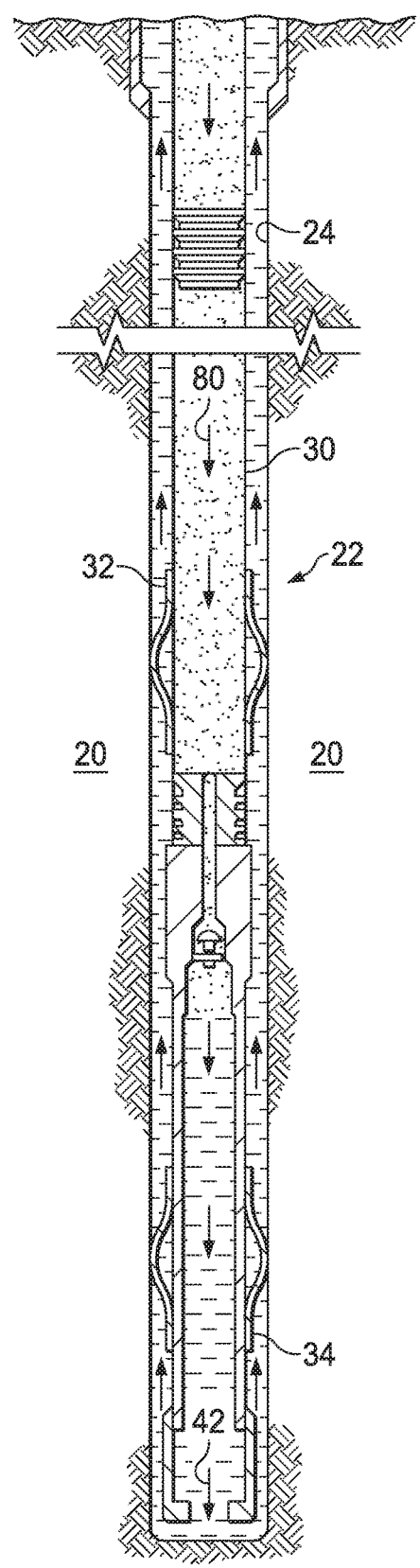
FIG. 13 is an elevation view of an exemplary wellbore in which a spacer fluid may be used.

As shown in FIG. 13, spacer fluid 80 may be used to flush drilling fluid from a subterranean formation 20 in accordance with example embodiments. As illustrated, wellbore 22 may be drilled into formation 20. While wellbore 22 is shown extending generally vertically into formation 20, the principles described herein are also applicable to wellbores that extend at an angle through formation 20, such as horizontal and slanted wellbores. One or more additional conduits (e.g., intermediate casing, production casing, and liners) shown here as casing 30 may also be disposed in the wellbore 22. Wellbore annulus 32 may be formed by casing 30 and walls 24 of wellbore 22. One or more centralizers 34 may be attached to casing 30, for example, to centralize casing 30 in wellbore 22 prior to and after flushing of the drilling fluid with the spacer fluid. Spacer fluid 80 may be pumped down the interior of casing 30, through casing shoe 42 at the bottom of casing 30 and up around casing 30 into wellbore annulus 32. Other techniques, such as reverse circulation, may also be to introduce spacer fluid 80 into wellbore 22. Spacer fluid 80 may fully displace any drilling fluid remaining in wellbore 22, or may itself be displaced when a cement is introduced into wellbore 22. At least a portion of spacer fluid 80 may exit wellbore annulus 32 via a flow line and be deposited, for example, in one or more retention pits (not expressly shown). While FIG. 13 generally depicts a land-based drilling assembly, the principles described herein are equally applicable to subsea drilling operations that employ floating or sea-based platforms and rigs, without departing from the scope of the disclosure.

Fracturing Fluids

During well stimulation treatments, a fracturing fluid with a viscosity sufficient to suspend proppant particles and to place the proppant particles in fractures, may be used to maintain the integrity of fractures once the hydraulic pressure creating the fractures is released. After the proppant is placed in a fracture and pumping stops, the fracture may remain open instead of closing. Once at least one fracture is created and the proppant is substantially in place, the viscosity of the fracturing fluid usually is reduced by breaking the viscosified treatment fluid via function of a breaking agent, thereby depositing the proppant and allowing the fluid to be recovered from the formation. Fracturing fluids may provide for proppant delivery without breaking. The proppant delivery fluid may be placed in a wellbore similar to the methods described above in FIGS. 1 and 13.

Embodiments disclosed herein include:

A. A composite fluid that includes an electrically insulating foundation fluid having a dielectric constant and a dielectric strength, and an additive combined with the foundation fluid that results in a composite fluid having a dielectric constant and a dielectric strength greater than the dielectric constant and the dielectric strength of the foundation fluid.

B. A method for creating a composite fluid that includes providing an electrically insulating foundation fluid with a dielectric constant and a dielectric strength, and adding an additive to the foundation fluid that results in a composite fluid having a dielectric constant and a dielectric strength greater than the dielectric constant and the dielectric strength of the foundation fluid.

C. A method of drilling a wellbore that includes forming a wellbore in a formation with a drill bit attached to a drill string; and pumping a drilling fluid through the drill string, the drill bit and the wellbore, the drilling fluid comprising an electrically insulating foundation fluid having a dielectric constant and a dielectric strength; and an additive combined with the foundation fluid that results in a composite fluid having a dielectric constant and a dielectric strength greater than the dielectric constant and the dielectric strength of the foundation fluid.

Each of embodiments A, B, and C may have one or more of the following additional elements in any combination: Element 1: wherein the additive comprises a plurality of particles having a dielectric constant and a dielectric strength greater than the dielectric constant and the dielectric strength of the foundation fluid. Element 2: wherein the plurality of particles are formed of a composition including mica. Element 3: wherein the additive comprises a conductive fluid soluble in the foundation fluid, the conductive fluid having an electrical conductivity greater than an electrical conductivity of the foundation fluid. Element 4: wherein the additive further comprises a plurality of particles having a dielectric constant greater than a dielectric constant of the foundation fluid combined with the conductive fluid. Element 5: wherein the conductive fluid is an alcohol. Element 6: wherein the additive comprises a plurality of particles treated to have electric dipoles. Element 7: wherein the additive comprises a plurality of particles created to have electric dipole moments. Element 8: wherein the foundation fluid is a non-aqueous, oil-based fluid. Element 9: wherein the additive is selected to maximize the dielectric constant of the composite fluid.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims. As an example, the teachings of the present disclosure may be applied to any downhole fluid used for any purpose related to the completion, production, and operation of a wellbore, in addition to fluids generally, such as those used in audio equipment, electromagnetic actuators, and biological applications.

What is claimed is:

1. A composite fluid, comprising:
an electrically insulating foundation fluid having a first dielectric constant and a first dielectric strength; and
a single additive combined with the foundation fluid that results in a composite fluid having a second dielectric constant greater than the first dielectric constant and a second dielectric strength greater than the first dielectric strength.

2. The composite fluid of claim 1, wherein the single additive comprises a plurality of particles having a dielectric constant greater than the first dielectric constant and a dielectric strength greater than the first dielectric strength.

3. The composite fluid of claim 2, wherein the plurality of particles are formed of a composition including mica.

4. The composite fluid of claim 1, further comprising another additive having a conductive fluid soluble in the foundation fluid, the conductive fluid having an electrical conductivity greater than an electrical conductivity of the foundation fluid.

5. The composite fluid of claim 4, wherein the single additive comprises a plurality of particles having a dielectric constant greater than a dielectric constant of the foundation fluid combined with the conductive fluid.

6. The composite fluid of claim 4, wherein the conductive fluid is an alcohol.

7. The composite fluid of claim 1, wherein the single additive comprises a plurality of particles having electric dipoles.

8. The composite fluid of claim 1, wherein the single additive comprises a plurality of particles having a net electric dipole moment.

9. The composite fluid of claim 1, wherein the foundation fluid is a non-aqueous, oil-based fluid.

10. The composite fluid of claim 1, wherein the single additive is selected such that the second dielectric constant is within a target range of dielectric constant values.

11. A method for creating a composite fluid, comprising:
providing an electrically insulating foundation fluid having a first dielectric constant and a first dielectric strength; and
adding a single additive to the foundation fluid that results in a composite fluid having a second dielectric constant greater than the first dielectric constant and a second dielectric strength greater than the first dielectric strength.

12. The method of claim 11, wherein the single additive comprises a plurality of particles having a dielectric constant greater than the first dielectric constant and a dielectric strength greater than the first dielectric strength.

13. The method of claim 12, wherein the plurality of particles are formed of a composition including mica.

14. The method of claim 11, further comprising adding another additive, wherein the other additive has a conductive fluid soluble in the foundation fluid, the conductive fluid having an electrical conductivity greater than an electrical conductivity of the foundation fluid.

15. The method of claim 14, wherein the single additive comprises a plurality of particles having a dielectric constant greater than a dielectric constant of the foundation fluid combined with the conductive fluid.

16. The method of claim 14, wherein the conductive fluid is an alcohol.

17. The method of claim 11, wherein:
the single additive comprises a plurality of particles; and
the method further comprises treating the plurality of particles to create electric dipoles.

18. The method of claim 11, wherein the single additive comprises a plurality of particles having a net electric dipole moment.

19. The method of claim 11, wherein the foundation fluid is a non-aqueous, oil-based fluid.

20. The method of claim 11, further comprising selecting the single additive such that the second dielectric constant is within a target range of dielectric constant values.

21. A method of drilling a wellbore, comprising
forming a wellbore in a formation with a drill bit attached to a drill string; and
pumping a drilling fluid through the drill string, the drill bit and the wellbore, the drilling fluid comprising:
an electrically insulating foundation fluid having a first dielectric constant and a first dielectric strength; and
a single additive combined with the foundation fluid that results in a composite fluid having a second dielectric constant greater than the first dielectric constant and a second dielectric strength greater than the first dielectric strength.

22. The method of claim 21, wherein the single additive comprises a plurality of particles having a dielectric constant greater than the first dielectric constant and a dielectric strength greater than the first dielectric strength.

23. The method of claim 21, wherein the drilling fluid further comprises another additive, the other additive having a conductive fluid soluble in the foundation fluid, the conductive fluid having an electrical conductivity greater than an electrical conductivity of the foundation fluid.

24. The method of claim 23, wherein the single additive comprises a plurality of particles having a dielectric constant greater than a dielectric constant of the foundation fluid combined with the conductive fluid.

* * * * *